United States Patent
Edwards

(10) Patent No.: US 10,579,836 B1
(45) Date of Patent: *Mar. 3, 2020

(54) DISPLACEABLE CARD READER CIRCUITRY

(71) Applicant: Square, Inc., San Francisco, CA (US)

(72) Inventor: Troy Edwards, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 15/692,501

(22) Filed: Aug. 31, 2017

Related U.S. Application Data

(63) Continuation of application No. 14/312,524, filed on Jun. 23, 2014, now Pat. No. 9,760,740.

(51) Int. Cl.
*G06Q 20/20* (2012.01)
*G06K 7/00* (2006.01)

(52) U.S. Cl.
CPC ......... *G06K 7/0004* (2013.01); *G06Q 20/204* (2013.01)

(58) Field of Classification Search
None
See application file for complete search history.

(56) References Cited

U.S. PATENT DOCUMENTS

| | | | |
|---|---|---|---|
| 3,854,036 A | 12/1974 | Gupta et al. | |
| 4,035,614 A | 7/1977 | Frattarola et al. | |
| 4,254,441 A | 3/1981 | Fisher | |
| 4,591,937 A | 5/1986 | Nakarai et al. | |
| D284,446 S | 7/1986 | Rosenblad | |
| 4,609,957 A | 9/1986 | Gentet et al. | |
| 4,727,544 A | 2/1988 | Brunner et al. | |
| 4,788,420 A | 11/1988 | Chang et al. | |
| 4,845,740 A | 7/1989 | Tokuyama et al. | |

(Continued)

FOREIGN PATENT DOCUMENTS

| CA | 2 812 251 A1 | 4/2012 |
|---|---|---|
| CA | 152789 S | 9/2014 |

(Continued)

OTHER PUBLICATIONS

Kuphaldt, T.R., "Practical Considerations—Batteries," Lessons in Electric Circuits, Batteries and Power Systems, Chapter 11, vol. I—DC, Retrieved from the Internet URL: www.allaboutcircuits.com/textbook/direct-current/chpt-11 /practical-considerations-batteries, on Jun. 9, 2017, pp. 1-5.

(Continued)

*Primary Examiner* — Paul Danneman
(74) *Attorney, Agent, or Firm* — Polsinelli PC—Square

(57) ABSTRACT

Aspects of the technology provide a multi-purpose card reader configured for use with a mobile electronic device (e.g., a mobile host), such as a smart phone or tablet computer. In certain aspects, the card reader is integrated into a case for enclosing the mobile electronic device and configured for reading financial information from a payment card to facilitate a financial transaction between a buyer and a merchant. To facilitate operability of the card reader, the case can include multiple card slots, such as a swipe-slot (e.g., for receiving a magnetic stripe payment card), and a dip-slot (e.g., for use in receiving an IC type payment card).

20 Claims, 6 Drawing Sheets

(56) References Cited

U.S. PATENT DOCUMENTS

| | | |
|---|---|---|
| 5,173,597 A | 12/1992 | Anglin |
| 5,266,789 A | 11/1993 | Anglin et al. |
| 5,406,627 A | 4/1995 | Thompson et al. |
| 5,434,395 A | 7/1995 | Storck et al. |
| 5,434,400 A | 7/1995 | Scherzer |
| 5,463,678 A | 10/1995 | Kepley, III et al. |
| 5,485,073 A | 1/1996 | Kasashima et al. |
| 5,553,294 A | 9/1996 | Nanno et al. |
| 5,589,855 A | 12/1996 | Blumstein et al. |
| 5,603,078 A | 2/1997 | Henderson et al. |
| 5,616,904 A | 4/1997 | Fernadez |
| 5,679,943 A | 10/1997 | Schultz et al. |
| 5,729,591 A | 3/1998 | Bailey |
| 5,763,862 A * | 6/1998 | Jachimowicz ....... G06K 7/0013 235/380 |
| 5,764,742 A | 6/1998 | Howard et al. |
| 5,781,013 A | 7/1998 | Takahashi |
| 5,835,366 A | 11/1998 | Pleso et al. |
| 5,850,599 A | 12/1998 | Seiderman |
| 5,878,337 A | 3/1999 | Joao et al. |
| 5,907,801 A | 5/1999 | Albert et al. |
| 5,933,498 A | 8/1999 | Schneck et al. |
| 5,945,654 A * | 8/1999 | Huang ................. G06K 7/084 235/449 |
| 5,949,047 A | 9/1999 | Abe et al. |
| 5,991,410 A | 11/1999 | Albert et al. |
| 5,991,749 A | 11/1999 | Morrill, Jr. |
| D417,442 S | 12/1999 | Butts et al. |
| 6,006,109 A | 12/1999 | Shin |
| 6,010,067 A | 1/2000 | Elbaum |
| 6,021,944 A | 2/2000 | Arakaki |
| 6,032,859 A | 3/2000 | Muehlberger et al. |
| 6,061,666 A | 5/2000 | Do et al. |
| 6,095,410 A | 8/2000 | Andersen et al. |
| 6,129,277 A | 10/2000 | Grant et al. |
| 6,150,823 A | 11/2000 | Takahashi et al. |
| 6,213,392 B1 | 4/2001 | Zuppicich |
| 6,230,267 B1 | 5/2001 | Richards et al. |
| 6,234,389 B1 | 5/2001 | Valliani et al. |
| 6,308,227 B1 | 10/2001 | Kumar et al. |
| 6,355,892 B1 | 3/2002 | Marks |
| 6,363,139 B1 | 3/2002 | Zurek et al. |
| 6,400,517 B1 | 6/2002 | Murao |
| 6,431,445 B1 | 8/2002 | DeLand, Jr. et al. |
| 6,476,743 B1 | 11/2002 | Brown et al. |
| 6,481,623 B1 | 11/2002 | Grant et al. |
| 6,497,368 B1 | 12/2002 | Friend et al. |
| 6,536,670 B1 | 3/2003 | Postman et al. |
| 6,579,728 B2 | 6/2003 | Grant et al. |
| D477,321 S | 7/2003 | Baughman |
| 6,612,488 B2 | 9/2003 | Suzuki |
| 6,698,654 B1 | 3/2004 | Zuppicich |
| 6,763,399 B2 | 7/2004 | Margalit et al. |
| 6,813,608 B1 | 11/2004 | Baranowski |
| 6,832,721 B2 | 12/2004 | Fujii |
| 6,850,147 B2 | 2/2005 | Prokoski et al. |
| 6,868,391 B1 | 3/2005 | Hultgren |
| 6,871,278 B1 | 3/2005 | Sciupac |
| 6,896,182 B2 | 5/2005 | Sakaguchi |
| 6,944,782 B2 | 9/2005 | von Mueller et al. |
| 6,945,454 B2 | 9/2005 | Tournemille et al. |
| 6,979,231 B2 | 12/2005 | Shinohara |
| 7,003,316 B1 | 2/2006 | Elias et al. |
| 7,013,149 B2 | 3/2006 | Vetro et al. |
| 7,149,296 B2 | 12/2006 | Brown et al. |
| 7,163,148 B2 | 1/2007 | Durbin et al. |
| 7,167,711 B1 | 1/2007 | Dennis |
| 7,252,232 B2 | 8/2007 | Fernandes et al. |
| D553,459 S | 10/2007 | Shor |
| 7,309,012 B2 | 12/2007 | von Mueller et al. |
| 7,324,836 B2 | 1/2008 | Steenstra et al. |
| 7,357,309 B2 | 4/2008 | Ghosh et al. |
| 7,363,054 B2 | 4/2008 | Elias et al. |
| D568,130 S | 5/2008 | Arns |
| D575,056 S | 8/2008 | Tan |
| 7,409,234 B2 | 8/2008 | Glezerman |
| 7,424,732 B2 | 9/2008 | Matsumoto et al. |
| 7,433,452 B2 | 10/2008 | Taylor et al. |
| 7,505,762 B2 | 3/2009 | Onyon et al. |
| 7,506,812 B2 | 3/2009 | von Mueller et al. |
| D590,828 S | 4/2009 | Sherrod et al. |
| 7,520,430 B1 | 4/2009 | Stewart et al. |
| D600,085 S | 9/2009 | Mandel et al. |
| 7,581,678 B2 | 9/2009 | Narendra et al. |
| 7,587,756 B2 | 9/2009 | Peart et al. |
| 7,600,673 B2 | 10/2009 | Stoutenburg et al. |
| D607,000 S | 12/2009 | Cheng et al. |
| 7,668,308 B1 | 2/2010 | Wurtz |
| 7,703,676 B2 | 4/2010 | Hart et al. |
| 7,708,189 B1 | 5/2010 | Cipriano |
| D620,330 S | 7/2010 | Krumpe et al. |
| 7,757,953 B2 | 7/2010 | Hart et al. |
| 7,793,834 B2 | 9/2010 | Hachey et al. |
| D624,912 S | 10/2010 | Chen et al. |
| 7,810,729 B2 * | 10/2010 | Morley, Jr. ............ G06K 7/083 235/435 |
| D630,073 S | 1/2011 | Krumpe et al. |
| 7,869,591 B1 | 1/2011 | Nagel et al. |
| 7,874,483 B2 | 1/2011 | Wang et al. |
| 7,896,248 B2 | 3/2011 | Morley, Jr. |
| 7,918,394 B1 | 4/2011 | Morley, Jr. |
| 7,945,494 B2 | 5/2011 | Williams |
| 8,011,587 B2 | 9/2011 | Johnson et al. |
| 8,015,070 B2 | 9/2011 | Sinha et al. |
| D646,264 S | 10/2011 | Dong |
| D653,664 S | 2/2012 | Turnbull et al. |
| 8,117,453 B2 | 2/2012 | Huque |
| D655,588 S | 3/2012 | Pennington et al. |
| 8,132,670 B1 | 3/2012 | Chen |
| 8,181,871 B2 | 5/2012 | Wang et al. |
| 8,231,055 B2 | 7/2012 | Wen |
| D668,125 S | 10/2012 | Pennington et al. |
| 8,281,998 B2 | 10/2012 | Tang et al. |
| 8,297,507 B2 | 10/2012 | Kayani |
| 8,302,860 B2 | 11/2012 | McKelvey |
| 8,336,771 B2 | 12/2012 | Tsai et al. |
| D675,618 S | 2/2013 | Behar et al. |
| 8,376,239 B1 | 2/2013 | Humphrey |
| D677,667 S | 3/2013 | Smith et al. |
| 8,397,103 B2 | 3/2013 | Baba |
| D679,714 S | 4/2013 | Smith et al. |
| D680,537 S | 4/2013 | Miller et al. |
| 8,413,901 B2 | 4/2013 | Wen |
| 8,452,004 B2 | 5/2013 | Lee |
| D686,208 S | 7/2013 | Miller et al. |
| 8,500,010 B1 | 8/2013 | Marcus et al. |
| 8,500,018 B2 | 8/2013 | McKelvey et al. |
| D689,753 S | 9/2013 | Yoo et al. |
| 8,560,823 B1 | 10/2013 | Aytek et al. |
| 8,571,989 B2 | 10/2013 | Dorsey et al. |
| 8,573,486 B2 | 11/2013 | McKelvey et al. |
| 8,573,487 B2 | 11/2013 | McKelvey |
| 8,573,489 B2 | 11/2013 | Dorsey et al. |
| 8,584,945 B2 | 11/2013 | Wang et al. |
| 8,584,946 B2 | 11/2013 | Morley, Jr. |
| 8,584,956 B2 | 11/2013 | Wilson et al. |
| 8,602,305 B2 | 12/2013 | Dorsey et al. |
| 8,612,352 B2 | 12/2013 | Dorsey et al. |
| 8,615,445 B2 | 12/2013 | Dorsey et al. |
| 8,640,953 B2 | 2/2014 | Dorsey et al. |
| D700,606 S | 3/2014 | Lo |
| 8,662,389 B2 | 3/2014 | Dorsey et al. |
| 8,678,277 B2 | 3/2014 | Dorsey et al. |
| D703,211 S | 4/2014 | Weller et al. |
| 8,701,996 B2 | 4/2014 | Dorsey et al. |
| 8,701,997 B2 | 4/2014 | Dorsey et al. |
| D706,266 S | 6/2014 | Rotsaert |
| 8,740,072 B1 | 6/2014 | Dorogusker |
| 8,751,039 B1 | 6/2014 | Macoviak et al. |
| 8,763,900 B2 | 7/2014 | Marcus et al. |
| D711,876 S | 8/2014 | McWilliam et al. |
| 8,794,517 B1 | 8/2014 | Templeton et al. |
| 8,807,431 B2 | 8/2014 | Wang et al. |
| D712,892 S | 9/2014 | Hong et al. |

(56) References Cited

U.S. PATENT DOCUMENTS

| | | |
|---|---|---|
| 8,820,650 B2 | 9/2014 | Wilson et al. |
| 8,840,017 B2 | 9/2014 | Chan et al. |
| 8,840,024 B2 | 9/2014 | McKelvey et al. |
| 8,870,070 B2 | 10/2014 | McKelvey et al. |
| 8,870,071 B2 | 10/2014 | McKelvey |
| 8,875,990 B2 | 11/2014 | Bishop et al. |
| 8,876,003 B2 | 11/2014 | McKelvey |
| 8,910,868 B1 | 12/2014 | Wade et al. |
| 8,931,699 B1 | 1/2015 | Wade et al. |
| D724,094 S | 3/2015 | Blochinger et al. |
| D725,655 S | 3/2015 | Debaigue et al. |
| 8,967,465 B1 | 3/2015 | Wade et al. |
| 8,983,873 B2 | 3/2015 | Lund |
| D726,171 S | 4/2015 | Edwards |
| 9,016,570 B1 | 4/2015 | Gluck |
| 9,016,572 B2 | 4/2015 | Babu et al. |
| D728,549 S | 5/2015 | Su et al. |
| D728,568 S | 5/2015 | Debaigue et al. |
| D731,493 S | 6/2015 | Mills |
| 9,063,737 B2 | 6/2015 | Babu et al. |
| 9,123,036 B2 | 9/2015 | Graylin et al. |
| 9,141,950 B2 | 9/2015 | Wade et al. |
| D740,285 S | 10/2015 | Templeton |
| D740,286 S | 10/2015 | Templeton |
| D740,820 S | 10/2015 | Templeton et al. |
| 9,195,454 B2 | 11/2015 | Wade et al. |
| 9,218,517 B2 | 12/2015 | Morley, Jr. |
| 9,224,142 B2 | 12/2015 | Lamba et al. |
| 9,230,143 B2 | 1/2016 | Wade et al. |
| 9,237,401 B2 | 1/2016 | Modi et al. |
| 9,256,769 B1 | 2/2016 | Lamfalusi et al. |
| 9,256,770 B1 | 2/2016 | Edwards |
| 9,262,757 B2 | 2/2016 | Lamba et al. |
| 9,262,777 B2 | 2/2016 | Lamba et al. |
| 9,286,635 B2 | 3/2016 | Lamba et al. |
| 9,305,314 B2 | 4/2016 | Babu et al. |
| 9,355,285 B1 | 5/2016 | Wade et al. |
| D762,651 S | 8/2016 | Edwards et al. |
| D766,238 S | 9/2016 | Nguyen |
| D766,901 S | 9/2016 | Nguyen |
| 9,449,203 B2 | 9/2016 | Lamba et al. |
| 9,460,322 B2 | 10/2016 | Lamfalusi et al. |
| 9,495,676 B2 | 11/2016 | Lamba et al. |
| D774,510 S | 12/2016 | Rotsaert |
| D776,658 S | 1/2017 | Zhu et al. |
| 9,576,159 B1 | 2/2017 | Templeton et al. |
| D780,731 S | 3/2017 | Kim et al. |
| 9,595,033 B2 | 3/2017 | Lamba et al. |
| 9,607,298 B2 | 3/2017 | Brudnicki et al. |
| 9,633,236 B1 | 4/2017 | Wade |
| 9,659,195 B2 | 5/2017 | Wade et al. |
| 9,665,867 B2 | 5/2017 | Guise et al. |
| 9,667,426 B2 | 5/2017 | Sekiya et al. |
| D795,869 S | 8/2017 | Templeton |
| 9,736,144 B2 | 8/2017 | McCanna et al. |
| 9,740,849 B2 | 8/2017 | Etchegoyen et al. |
| 9,760,740 B1* | 9/2017 | Edwards .............. G06Q 20/204 |
| 9,760,962 B2 | 9/2017 | Lese |
| 9,769,134 B2 | 9/2017 | Dominguez et al. |
| 9,788,205 B2 | 10/2017 | Sarmah et al. |
| 9,836,594 B2 | 12/2017 | Zhang et al. |
| 9,836,601 B2 | 12/2017 | Pulapaka et al. |
| 9,852,412 B1 | 12/2017 | Post et al. |
| 9,870,491 B1 | 1/2018 | Wade |
| 2001/0001856 A1 | 5/2001 | Gould et al. |
| 2002/0002507 A1 | 1/2002 | Hatakeyama |
| 2002/0030871 A1 | 3/2002 | Anderson et al. |
| 2002/0073304 A1 | 6/2002 | Marsh et al. |
| 2002/0077974 A1 | 6/2002 | Ortiz |
| 2002/0084771 A1 | 7/2002 | Lundberg |
| 2002/0099648 A1 | 7/2002 | DeVoe et al. |
| 2002/0108062 A1 | 8/2002 | Nakajima et al. |
| 2002/0165462 A1 | 11/2002 | Westbrook et al. |
| 2002/0169541 A1 | 11/2002 | Bouve et al. |
| 2002/0188535 A1 | 12/2002 | Chao et al. |
| 2003/0089772 A1 | 5/2003 | Chien |
| 2003/0132300 A1 | 7/2003 | Dilday et al. |
| 2003/0135463 A1 | 7/2003 | Brown et al. |
| 2003/0144040 A1 | 7/2003 | Liu et al. |
| 2004/0011650 A1 | 1/2004 | Zenhausern et al. |
| 2004/0012875 A1 | 1/2004 | Wood |
| 2004/0033726 A1 | 2/2004 | Kao |
| 2004/0041911 A1 | 3/2004 | Odagiri et al. |
| 2004/0058705 A1 | 3/2004 | Morgan et al. |
| 2004/0087339 A1 | 5/2004 | Goldthwaite et al. |
| 2004/0093496 A1 | 5/2004 | Colnot |
| 2004/0104268 A1 | 6/2004 | Bailey |
| 2004/0127256 A1 | 7/2004 | Goldthwaite et al. |
| 2004/0128256 A1 | 7/2004 | Krouse et al. |
| 2004/0151026 A1 | 8/2004 | Naso et al. |
| 2004/0178326 A1 | 9/2004 | Hamilton et al. |
| 2004/0204074 A1 | 10/2004 | Desai |
| 2004/0204082 A1 | 10/2004 | Abeyta |
| 2004/0230489 A1 | 11/2004 | Goldthwaite et al. |
| 2004/0230526 A1 | 11/2004 | Praisner |
| 2004/0235524 A1 | 11/2004 | Abuhamdeh |
| 2004/0251907 A1 | 12/2004 | Kalley |
| 2005/0009004 A1 | 1/2005 | Xu et al. |
| 2005/0010702 A1 | 1/2005 | Saito et al. |
| 2005/0023348 A1 | 2/2005 | Lucas et al. |
| 2005/0077870 A1 | 4/2005 | Ha et al. |
| 2005/0156037 A1 | 7/2005 | Wurzburg |
| 2005/0156038 A1 | 7/2005 | Wurzburg et al. |
| 2005/0164631 A1 | 7/2005 | Jin |
| 2005/0167496 A1 | 8/2005 | Morley, Jr. et al. |
| 2005/0194452 A1 | 9/2005 | Nordentoft et al. |
| 2005/0209719 A1 | 9/2005 | Beckert et al. |
| 2005/0236480 A1 | 10/2005 | Vrotsos et al. |
| 2005/0242171 A1 | 11/2005 | Smets et al. |
| 2005/0242173 A1 | 11/2005 | Suzuki |
| 2005/0247787 A1 | 11/2005 | Von Mueller et al. |
| 2006/0000917 A1 | 1/2006 | Kim et al. |
| 2006/0094481 A1 | 5/2006 | Gullickson |
| 2006/0095551 A1 | 5/2006 | Leung et al. |
| 2006/0122902 A1 | 6/2006 | Petrov et al. |
| 2006/0123138 A1 | 6/2006 | Perdomo et al. |
| 2006/0152276 A1 | 7/2006 | Barksdale |
| 2006/0208066 A1 | 9/2006 | Finn et al. |
| 2006/0219776 A1 | 10/2006 | Finn |
| 2006/0223580 A1 | 10/2006 | Antonio et al. |
| 2006/0234771 A1 | 10/2006 | Shavrov |
| 2006/0255128 A1 | 11/2006 | Johnson et al. |
| 2006/0273158 A1 | 12/2006 | Suzuki |
| 2007/0063048 A1 | 3/2007 | Havens et al. |
| 2007/0067833 A1 | 3/2007 | Colnot |
| 2007/0100651 A1 | 5/2007 | Ramer et al. |
| 2007/0118736 A1 | 5/2007 | Huque |
| 2007/0124211 A1 | 5/2007 | Smith |
| 2007/0155430 A1 | 7/2007 | Cheon et al. |
| 2007/0174080 A1 | 7/2007 | Outwater |
| 2007/0201492 A1 | 8/2007 | Kobayashi |
| 2007/0221728 A1 | 9/2007 | Ferro et al. |
| 2007/0236336 A1 | 10/2007 | Borcherding |
| 2007/0241182 A1 | 10/2007 | Buer |
| 2007/0244811 A1 | 10/2007 | Tumminaro |
| 2007/0250623 A1 | 10/2007 | Hickey et al. |
| 2007/0255620 A1 | 11/2007 | Tumminaro et al. |
| 2007/0255643 A1 | 11/2007 | Capuano et al. |
| 2007/0255653 A1 | 11/2007 | Tumminaro et al. |
| 2007/0276765 A1 | 11/2007 | Hazel et al. |
| 2007/0285056 A1 | 12/2007 | Yoon et al. |
| 2007/0287498 A1 | 12/2007 | Wang et al. |
| 2008/0011850 A1* | 1/2008 | Henry .................. G06K 7/0004 235/441 |
| 2008/0027815 A1 | 1/2008 | Johnson et al. |
| 2008/0040265 A1 | 2/2008 | Rackley III et al. |
| 2008/0040274 A1 | 2/2008 | Uzo |
| 2008/0059370 A1 | 3/2008 | Sada et al. |
| 2008/0059375 A1 | 3/2008 | Abifaker |
| 2008/0094069 A1 | 4/2008 | Huang |
| 2008/0103972 A1 | 5/2008 | Lanc |
| 2008/0123862 A1 | 5/2008 | Rowley |
| 2008/0147564 A1 | 6/2008 | Singhal |
| 2008/0159543 A1 | 7/2008 | Frisch et al. |

(56) References Cited

U.S. PATENT DOCUMENTS

| | | |
|---|---|---|
| 2008/0172306 A1 | 7/2008 | Schorr et al. |
| 2008/0177662 A1 | 7/2008 | Smith et al. |
| 2008/0208762 A1 | 8/2008 | Arthur et al. |
| 2008/0238610 A1 | 10/2008 | Rosenberg |
| 2008/0249939 A1 | 10/2008 | Veenstra |
| 2008/0275779 A1 | 11/2008 | Lakshminarayanan |
| 2008/0294766 A1 | 11/2008 | Wang et al. |
| 2008/0301056 A1 | 12/2008 | Weller et al. |
| 2009/0048978 A1 | 2/2009 | Ginter et al. |
| 2009/0068982 A1 | 3/2009 | Chen et al. |
| 2009/0098908 A1 | 4/2009 | Silverbrook et al. |
| 2009/0100168 A1 | 4/2009 | Harris |
| 2009/0103725 A1 | 4/2009 | Tang et al. |
| 2009/0104920 A1 | 4/2009 | Moon et al. |
| 2009/0117883 A1 | 5/2009 | Coffing et al. |
| 2009/0119190 A1 | 5/2009 | Realini |
| 2009/0125429 A1 | 5/2009 | Takayama |
| 2009/0128090 A1 | 5/2009 | Bi |
| 2009/0144161 A1 | 6/2009 | Fisher |
| 2009/0144202 A1 | 6/2009 | Hurry |
| 2009/0150294 A1 | 6/2009 | March et al. |
| 2009/0159681 A1 | 6/2009 | Mullen et al. |
| 2009/0166422 A1 | 7/2009 | Biskupski |
| 2009/0172384 A1 | 7/2009 | Anson |
| 2009/0180354 A1 | 7/2009 | Sander et al. |
| 2009/0187492 A1 | 7/2009 | Hammad et al. |
| 2009/0198618 A1 | 8/2009 | Chan et al. |
| 2009/0224771 A1 | 9/2009 | Deveau et al. |
| 2009/0261166 A1 | 10/2009 | Lawson et al. |
| 2009/0284877 A1 | 11/2009 | Heravi et al. |
| 2009/0302806 A1 | 12/2009 | Lindlar et al. |
| 2010/0063893 A1 | 3/2010 | Townsend |
| 2010/0127857 A1 | 5/2010 | Kilmurray et al. |
| 2010/0128449 A1 | 5/2010 | Mangaroo |
| 2010/0128900 A1 | 5/2010 | Johnson |
| 2010/0138666 A1 | 6/2010 | Adams et al. |
| 2010/0184479 A1 | 7/2010 | Griffin, Jr. |
| 2010/0222000 A1 | 9/2010 | Sauer et al. |
| 2010/0241838 A1 | 9/2010 | Cohen et al. |
| 2010/0243732 A1 | 9/2010 | Wallner |
| 2010/0260341 A1 | 10/2010 | Sander et al. |
| 2010/0289390 A1 | 11/2010 | Kenney |
| 2011/0033910 A1 | 2/2011 | Yamanaka et al. |
| 2011/0053560 A1 | 3/2011 | Jain et al. |
| 2011/0078081 A1 | 3/2011 | Pirzadeh et al. |
| 2011/0084131 A1 | 4/2011 | McKelvey |
| 2011/0084139 A1 | 4/2011 | McKelvey et al. |
| 2011/0121654 A1 | 5/2011 | Recker et al. |
| 2011/0137803 A1 | 6/2011 | Willins |
| 2011/0161235 A1 | 6/2011 | Beenau et al. |
| 2011/0165896 A1 | 7/2011 | Stromberg et al. |
| 2011/0191196 A1 | 8/2011 | Orr et al. |
| 2011/0198395 A1 | 8/2011 | Chen |
| 2011/0202463 A1 | 8/2011 | Powell |
| 2011/0231272 A1 | 9/2011 | Englund et al. |
| 2011/0253788 A1 | 10/2011 | Campbell et al. |
| 2011/0258120 A1 | 10/2011 | Weiss |
| 2011/0307733 A1 | 12/2011 | Tokunaga |
| 2011/0309145 A1 | 12/2011 | Richardson et al. |
| 2011/0313880 A1 | 12/2011 | Paul et al. |
| 2012/0005039 A1 | 1/2012 | Dorsey et al. |
| 2012/0005096 A1 | 1/2012 | Dorsey et al. |
| 2012/0008851 A1 | 1/2012 | Pennock et al. |
| 2012/0011071 A1 | 1/2012 | Pennock et al. |
| 2012/0012653 A1 | 1/2012 | Johnson et al. |
| 2012/0016794 A1 | 1/2012 | Orr et al. |
| 2012/0026018 A1 | 2/2012 | Lin |
| 2012/0032681 A1 | 2/2012 | Fink |
| 2012/0051554 A1 | 3/2012 | Modi et al. |
| 2012/0052910 A1 | 3/2012 | Mu et al. |
| 2012/0066079 A1 | 3/2012 | Falzone et al. |
| 2012/0095870 A1 | 4/2012 | McKelvey |
| 2012/0095871 A1 | 4/2012 | Dorsey et al. |
| 2012/0095906 A1 | 4/2012 | Dorsey et al. |
| 2012/0095907 A1 | 4/2012 | Dorsey et al. |
| 2012/0095916 A1 | 4/2012 | Dorsey et al. |
| 2012/0118959 A1 | 5/2012 | Sather et al. |
| 2012/0118960 A1 | 5/2012 | Sather et al. |
| 2012/0126005 A1 | 5/2012 | Dorsey et al. |
| 2012/0126006 A1 | 5/2012 | Dorsey et al. |
| 2012/0126007 A1 | 5/2012 | Lamba et al. |
| 2012/0126010 A1 | 5/2012 | Babu et al. |
| 2012/0126013 A1 | 5/2012 | Sather et al. |
| 2012/0126014 A1 | 5/2012 | Sather et al. |
| 2012/0130903 A1 | 5/2012 | Dorsey et al. |
| 2012/0138683 A1 | 6/2012 | Sather et al. |
| 2012/0154561 A1 | 6/2012 | Chari |
| 2012/0168505 A1 | 7/2012 | Sather et al. |
| 2012/0210325 A1 | 8/2012 | de Lind van Wijngaarden et al. |
| 2012/0211558 A1 | 8/2012 | Buer |
| 2012/0234918 A1 | 9/2012 | Lindsay |
| 2012/0246074 A1 | 9/2012 | Annamalai et al. |
| 2012/0255996 A1 | 10/2012 | Ahmed et al. |
| 2012/0259651 A1 | 10/2012 | Mallon et al. |
| 2012/0270528 A1 | 10/2012 | Goodman |
| 2012/0305645 A1 | 12/2012 | Morley, Jr. |
| 2012/0323512 A1 | 12/2012 | Rhodin |
| 2013/0021046 A1 | 1/2013 | Prentice et al. |
| 2013/0024372 A1 | 1/2013 | Spodak et al. |
| 2013/0030997 A1 | 1/2013 | Spodak et al. |
| 2013/0031004 A1 | 1/2013 | Dorsey et al. |
| 2013/0077229 A1 | 3/2013 | Tsai et al. |
| 2013/0087614 A1 | 4/2013 | Limtao et al. |
| 2013/0130743 A1 | 5/2013 | Lin |
| 2013/0137367 A1 | 5/2013 | Fisher |
| 2013/0140899 A1 | 6/2013 | Tuukkanen et al. |
| 2013/0144792 A1 | 6/2013 | Nilsson et al. |
| 2013/0185559 A1 | 7/2013 | Morel et al. |
| 2013/0200153 A1 | 8/2013 | Dorsey et al. |
| 2013/0207481 A1 | 8/2013 | Gobburu et al. |
| 2013/0211929 A1 | 8/2013 | Itwaru |
| 2013/0254117 A1 | 9/2013 | von Mueller et al. |
| 2013/0254574 A1 | 9/2013 | Zacchio et al. |
| 2013/0289908 A1 | 10/2013 | Nonoyama |
| 2013/0290762 A1 | 10/2013 | Pawar |
| 2013/0303277 A1 | 11/2013 | Shigeta |
| 2013/0304244 A1 | 11/2013 | Ojanpera |
| 2013/0313903 A1 | 11/2013 | Kayama |
| 2014/0001257 A1 | 1/2014 | Dorsey et al. |
| 2014/0017955 A1 | 1/2014 | Lo et al. |
| 2014/0018016 A1 | 1/2014 | Chang et al. |
| 2014/0061301 A1 | 3/2014 | Cho et al. |
| 2014/0076964 A1 | 3/2014 | Morley, Jr. |
| 2014/0089205 A1 | 3/2014 | Kapur et al. |
| 2014/0097242 A1 | 4/2014 | McKelvey |
| 2014/0120866 A1 | 5/2014 | Furtney |
| 2014/0124576 A1 | 5/2014 | Zhou et al. |
| 2014/0131442 A1 | 5/2014 | Morrow et al. |
| 2014/0144983 A1 | 5/2014 | Dorsey et al. |
| 2014/0167503 A1 | 6/2014 | Redpath et al. |
| 2014/0203082 A1 | 7/2014 | Huh |
| 2014/0258132 A1 | 9/2014 | Swamy et al. |
| 2014/0265642 A1 | 9/2014 | Utley et al. |
| 2014/0295761 A1 | 10/2014 | Lo |
| 2014/0297539 A1 | 10/2014 | Swamy et al. |
| 2014/0312691 A1 | 10/2014 | Doljack et al. |
| 2015/0025822 A1 | 1/2015 | Ladret |
| 2015/0078560 A1 | 3/2015 | Ilango et al. |
| 2015/0100495 A1 | 4/2015 | Salama et al. |
| 2015/0132624 A1 | 5/2015 | Nagato |
| 2015/0200590 A1 | 7/2015 | Tanzawa |
| 2016/0034881 A1 | 2/2016 | Post et al. |
| 2016/0055478 A1 | 2/2016 | Skoog |
| 2016/0161565 A1 | 6/2016 | Wade |
| 2016/0188915 A1 | 6/2016 | Babu et al. |
| 2016/0203667 A1 | 7/2016 | Lamba et al. |
| 2016/0371513 A1 | 12/2016 | Lamba et al. |

FOREIGN PATENT DOCUMENTS

| | | |
|---|---|---|
| CA | 2 932 849 A1 | 6/2015 |
| CA | 2 920 589 A1 | 8/2016 |
| CN | 2459833 Y | 11/2001 |
| CN | 2543289 Y | 4/2003 |

(56) References Cited

FOREIGN PATENT DOCUMENTS

| | | |
|---|---|---|
| CN | 1682240 A | 10/2005 |
| CN | 1860730 A | 11/2006 |
| CN | 101520928 A | 9/2009 |
| CN | 102598046 A | 7/2012 |
| CN | 302341093 S | 3/2013 |
| CN | 302526592 S | 8/2013 |
| CN | 104680369 A | 6/2015 |
| EP | 1 145 766 A2 | 10/2001 |
| EP | 1 895 312 A1 | 3/2008 |
| EP | 2 693 298 A2 | 2/2014 |
| EP | 3 091 474 A1 | 11/2016 |
| HK | 1211124 A1 | 5/2016 |
| JP | 2001-313714 A | 11/2001 |
| JP | 2003-108777 A | 4/2003 |
| JP | 2004-078662 A | 3/2004 |
| JP | 2005-063869 A | 3/2005 |
| JP | 2005-242550 A | 9/2005 |
| JP | 2005-269172 A | 9/2005 |
| JP | 2009-199649 A | 9/2009 |
| JP | 2013-518344 A | 5/2013 |
| JP | 2013-541105 A | 11/2013 |
| KR | 10-0452161 B1 | 10/2004 |
| KR | 10-2005-0077659 A | 8/2005 |
| KR | 10-2008-0039330 A | 5/2008 |
| MX | 2012004397 A | 8/2012 |
| WO | 01/37199 A1 | 5/2001 |
| WO | 01/65827 A2 | 9/2001 |
| WO | 02/084548 A1 | 10/2002 |
| WO | 2007/070592 A2 | 6/2007 |
| WO | 2009/128483 A1 | 10/2009 |
| WO | 2010/097711 A2 | 9/2010 |
| WO | 2010/111130 A2 | 9/2010 |
| WO | 2010/135174 A1 | 11/2010 |
| WO | 2011/047028 A2 | 4/2011 |
| WO | 2011/047030 A2 | 4/2011 |
| WO | 2012/051070 A2 | 4/2012 |
| WO | 2012/103138 A1 | 8/2012 |
| WO | 2013/009891 A1 | 1/2013 |
| WO | 2013/074499 A1 | 5/2013 |
| WO | 2015/081002 A1 | 6/2015 |
| WO | 2015/089301 A1 | 6/2015 |
| WO | 2016/019206 A1 | 2/2016 |
| WO | 2016/028823 A1 | 2/2016 |
| WO | 2016/094419 A1 | 6/2016 |

OTHER PUBLICATIONS

Scherz, P., "Practical Electronics for Inventors," The McGraw-Hill Companies, Inc., pp. 1-8 (2000).
White, R., "How Computers Work," Que, Seventh Edition, pp. 1-23 (Oct. 15, 2003).
Non-Final Office Action dated Oct. 8, 2013, for U.S. Appl. No. 13/826,171, of Dorogusker, J., filed Mar. 14, 2013.
Notice of Allowance dated Jan. 24, 2014, for U.S. Appl. No. 13/826,171, of Dorogusker, J., filed Mar. 14, 2013.
Non-Final Office Action dated Jan. 29, 2014, in Design U.S. Appl. No. 29/447,765, of Templeton T., filed Mar. 6, 2013.
Non-Final Office Action dated Sep. 10, 2014, in Design U.S. Appl. No. 29/447,765, of Templeton T., filed Mar. 6, 2013.
Final Office Action dated Mar. 20, 2015, in Design U.S. Appl. No. 29/447,765, of Templeton T., filed Mar. 6, 2013.
Notice of Allowance dated Jun. 5, 2015, in Design U.S. Appl. No. 29/447,765, of Templeton T., filed Mar. 6, 2013.
Non-Final Office Action dated Jul. 30, 2015, for U.S. Appl. No. 13/652,365, of Behren, R.V., et al., filed Oct. 15, 2012.
Non-Final Office Action dated Sep. 18, 2015, for U.S. Appl. No. 14/450,128, of Wade, J., filed Aug. 1, 2014.
Final Office Action dated Mar. 16, 2016, for U.S. Appl. No. 13/652,365, of Behren, R.V., et al., filed Oct. 15, 2012.
Non-Final Office Action dated Apr. 11, 2016, for U.S. Appl. No. 14/450,128, of Wade, J., filed Aug. 1, 2014.
Non-Final Office Action dated Oct. 28, 2016, for U.S. Appl. No. 14/450,128, of Wade, J., filed Aug. 1, 2014.
Non-Final Office Action dated Jan. 13, 2017, for U.S. Appl. No. 14/448,714, of Post, D., et al., filed Jul. 31, 2014.
Non-Final Office Action dated Feb. 9, 2017, for U.S. Appl. No. 14/472,217, of Post, D.J., et al., filed Aug. 28, 2014.
Notice of Allowance dated Jun. 12, 2017, for Design U.S. Appl. No. 29/539,675, of Templeton, T., filed Sep. 16, 2015.
Final Office Action dated Jun. 16, 2017, for U.S. Appl. No. 14/450,128, of Wade, J., filed Aug. 1, 2014.
Non-Final Office Action dated Jul. 10, 2017, for U.S. Appl. No. 14/448,714, of Post, D., et al., filed Jul. 31, 2014.
Non-Final Office Action dated Jul. 28, 2017, for U.S. Appl. No. 13/652,365, of Behren, R.V., et al., filed Oct. 15, 2012.
Non-Final Office Action dated Aug. 9, 2017, for U.S. Appl. No. 14/565,277, of Wade, J., filed Dec. 9, 2014.
Notice of Allowance dated Aug. 22, 2017, for U.S. Appl. No. 14/472,217, of Post, D.J., et al., filed Aug. 28, 2014.
Notice of Allowance dated Aug. 31, 2017, for U.S. Appl. No. 14/450,128, of Wade, J., filed Aug. 1, 2014.
Final Office Action dated Mar. 7, 2018, for U.S. Appl. No. 13/652,365, of Behren, R.V., et al., filed Oct. 15, 2012.
Final Office Action dated Mar. 27, 2018, for U.S. Appl. No. 14/448,714, of Post, D., et al., filed Jul. 31, 2014.
Notice of Allowance dated Jun. 5, 2018, for U.S. Appl. No. 14/448,714, of Post, D., et al., filed Jul. 31, 2014.
Advisory Action dated Jun. 6, 2018, for U.S. Appl. No. 13/652,365, of Behren, R.V., et al., filed Oct. 15, 2012.
International Search Report and Written Opinion for International Application No. PCT/US2015/043027, dated Nov. 4, 2015.
International Search Report and Written Opinion for International Application No. PCT/US2015/064524, dated Feb. 19, 2016.
Extended European Search Report for European Patent Application No. 15866468.0, dated Dec. 14, 2017.
Final office Action dated Jul. 9, 2012 for U.S. Appl. No. 13/043,263, of McKelvey, J., filed Mar. 8, 2011.
Final Office Action dated Jul. 13, 2012 for U.S. Appl. No. 13/043,258, of McKelvey, J., filed Mar. 8, 2011.
Non-Final Office Action dated Jul. 19, 2012 for U.S. Appl. No. 12/903,758, of Wilson, M., et al., filed Oct. 13, 2010.
Advisory Action dated Aug. 1, 2012 for U.S. Appl. No. 13/043,203, of McKelvey, J., filed Mar. 8, 2011.
Advisory Action dated Aug. 15, 2012 for U.S. Appl. No. 13/043,258, of McKelvey, J., filed Mar. 8, 2011.
Advisory Action dated Aug. 16, 2012 for U.S. Appl. No. 13/043,263, of McKelvey, J., filed Mar. 8, 2011.
Advisory Action dated Aug. 17, 2012 for U.S. Appl. No. 13/005,822, of McKelvey, J., et al., filed Jan. 13, 2011.
Advisory Action dated Aug. 24, 2012 for U.S. Appl. No. 13/010,976, of Babu, A. R., et al., filed Jan. 21, 2011.
Final Office Action dated Apr. 24, 2013 for U.S. Appl. No. 12/903,758, of Wilson, M., et al., filed Oct. 13, 2010.
Non-Final Office Action dated Apr. 25, 2013 for U.S. Appl. No. 13/298,491, of Lamba, K., et al., filed Nov. 17, 2011.
Non-Final Office Action dated Apr. 29, 2013 for U.S. Appl. No. 13/298,487, of Babu, A., et al., filed Nov. 17, 2011.
Non-Final Office Action dated Apr. 29, 2013 for U.S. Appl. No. 13/043,263, of McKelvey, J., filed Mar. 8, 2011.
Non-Final office Action dated Apr. 30, 2013 for U.S. Appl. No. 13/043,203, of McKelvey, J., filed Mar. 8, 2011.
Non-Final Office Action dated May 28, 2013 for U.S. Appl. No. 13/298,560, of Lamba K. et al., filed Nov. 17, 2011.
Non-Final Office Action dated Jun. 18, 2013 for U.S. Appl. No. 13/005,822, of McKelvey, J., et al., filed Jan. 13, 2011.
Non-Final Office Action dated Jul. 8, 2013 for U.S. Appl. No. 12/903,753, of McKelvey, J., et al., filed Oct. 13, 2010.
Notice of Allowance dated Jul. 9, 2013 for U.S. Appl. No. 13/043,203, of McKelvey, J., filed Mar. 8, 2011.
Notice of Allowance dated Aug. 6, 2013 for U.S. Appl. No. 12/903,758, of Wilson, M., et al., filed Oct. 13, 2010.
Final Office Action dated Aug. 15, 2013 for U.S. Appl. No. 13/043,263, of McKelvey, J., filed Mar. 8, 2011.

(56) References Cited

OTHER PUBLICATIONS

Final Office Action dated Aug. 22, 2013 for U.S. Appl. No. 13/298,487, of Babu, A., et al., filed Nov. 17, 2011.
Final Office Action dated Sep. 6, 2013 for U.S. Appl. No. 13/298,560, of Lamba K. et al., filed Nov. 17, 2011.
Final Office Action dated Sep. 17, 2013 for U.S. Appl. No. 13/298,491, of Lamba, K., et al., filed Nov. 17, 2011.
Notice of Allowance dated Oct. 10, 2013, for U.S. Appl. No. 12/903,753, of Mckelvey, J., filed Oct. 13, 2010.
Advisory Action dated Oct. 21, 2013 for U.S. Appl. No. 13/298,560 of Lamba K. et al., filed Nov. 17, 2011.
Advisory Action dated Oct. 22, 2013 for U.S. Appl. No. 13/298,487, of Babu, A., et al., filed Nov. 17, 2011.
Advisory Action dated Oct. 22, 2013 for U.S. Appl. No. 13/298,491, of Lamba, K., et al., filed Nov. 17, 2011.
Advisory Action dated Nov. 8, 2013 for U.S. Appl. No. 13/043,263, of McKelvey, J., filed Mar. 8, 2011.
Non-Final Office Action dated Nov. 21, 2013 for U.S. Appl. No. 14/052,009, of Wilson, M., et al., filed Oct. 11, 2013.
Non-Final Office Action dated Dec. 10, 2013 for U.S. Appl. No. 13/005,822 of McKelvey, J., et al., filed Jan. 13, 2011.
Non-Final Office Action dated Dec. 11, 2013 for U.S. Appl. No. 13/043,258, of McKelvey, J., filed Mar. 8, 2011.
Non-Final Office Action dated Feb. 24, 2014 for U.S. Appl. No. 13/043,263, of McKelvey, J., filed Mar. 8, 2011.
European Search Report and Opinion for European Patent Application No. 11 786 731.7, dated Mar. 28, 2014.
Non-Final Office Action dated Apr. 2, 2014 for U.S. Appl. No. 14/012,655, of McKelvey, J., filed Aug. 28, 2013.
Notice of Allowance dated Apr. 4, 2014 for U.S. Appl. No. 14/052,009, of Wilson, M., et al., filed Oct. 11, 2013.
English-language translation of Search Report for Japanese Patent Application No. 2013-533897, dated Apr. 14, 2014.
English-language translation of Office Action for Japanese Patent Application No. 2013-533897, dated Jun. 5, 2014.
Non-Final Office Action dated Jun. 6, 2014 for U.S. Appl. No. 14/231,598, of Wade, J., et al., filed Mar. 31, 2014.
Notice of Allowance dated Jun. 24, 2014 for U.S. Appl. No. 13/005,822, of McKelvey, J., et al., filed Jan. 13, 2011.
Notice of Allowance dated Jul. 1, 2014 for U.S. Appl. No. 13/043,258, of McKelvey, J., filed Mar. 8, 2011.
Notice of Allowance dated Jul. 15, 2014 for U.S. Appl. No. 13/043,263, of McKelvey, J., filed Mar. 8, 2011.
Non-Final Office Action dated Jul. 17, 2014 for U.S. Appl. No. 13/298,491, of Lamba, K., et al., filed Nov. 17, 2011.
Non-Final Office Action dated Jul. 22, 2014 for U.S. Appl. No. 13/298,560, of Lamba K. et al., filed Nov. 17, 2011.
Notice of Allowance dated Jul. 30, 2014 for U.S. Appl. No. 14/052,009, of Wilson, M., et al., filed Oct. 11, 2013.
Notice of Allowance dated Aug. 1, 2014 for U.S. Appl. No. 14/203,463, of Wade, J., et al., filed Mar. 10, 2014.
Non-Final Office Action dated Aug. 15, 2014 for U.S. Appl. No. 13/010,976, of Babu, A. R., et al., filed Jan. 21, 2011.
Final Office Action dated Aug. 15, 2014 for U.S. Appl. No. 14/012,655, of McKelvey, J., filed Aug. 28, 2013.
Non-Final Office Action dated Aug. 21, 2014 for U.S. Appl. No. 13/298,487, of Lamba, K., et al., filed Nov. 17, 2011.
English-language translation of Office Action for Chinese Patent Application No. 201080051400.5, dated Sep. 3, 2014.
Non-Final Office Action dated Sep. 11, 2014 for U.S. Appl. No. 13/298,501, of Babu, A., et al., filed Nov. 17, 2011.
Non-Final Office Action dated Sep. 11, 2014 for U.S. Appl. No. 13/298,506, of Lamba, K, et al., filed Nov. 17, 2011.
Jorgensen, A., "Square," dated Nov. 19, 2010, Retrieved from the Internet URL: http://andrew.orgensenfamily.us/2010/11/square/, on Jun. 6, 2014, p. 1-3.
Thomas, T., "iPhone Credit Card Readers," dated Feb. 11, 2011, Retrieved from the Internet URL: <http://credit-card-processing-review.toptenreviews.com/mobile-credit-card-processing/iphone-credit-card-readers-pg9.html>., on Jun. 6, 2014, p. 1-3.

Final Office Action dated Sep. 28, 2018, for U.S. Appl. No. 14/565,277, of Wade, J., filed Sep. 12, 2014.
Advisory Action dated Dec. 13, 2018, for U.S. Appl. No. 14/565,277, of Wade, J., filed Sep. 12, 2014.
"2.5mm Headset Jack," Retrieved from the Internet URL: http://www.phonescoop.com/glossary/term.php?gid=360, on May 5, 2011, pp. 1-1.
"A Magnetic Stripe Reader—Read Credit Cards & Driver Licences!," Articlesbase (articlesbase.com), dated Sep. 7, 2009, Retrieved from the Internet URL: http://www.articlesbase.com/electronics-articles/a-magnetic-stripe-reader-read-credit-cards- . . . , on Feb. 8, 2011, pp. 1-3.
"Arduino magnetic stripe decoder," Instructables, Retrieved from the Internet URL: http://www.instructables.com/id/Arduino-magneticstripe-decorder/, on Feb. 8, 2011, pp. 1-5.
"Barcode scanner and Magnetic Stripe Reader (MSR) for Pocke . . . ," Tom's Hardware (tomshardware.com), Retrieved from the Internet URL: http://www.tomshardware.com/forum/24068-36-barcode-scanner-magnetic-stripe-reader-po . . . , on Feb. 8, 2011, pp. 1-2.
"Credit Card Swiper and Reader for iPhone, iPad, Blackberry, Android and more," Retrieved from the Internet URL: http://hubpages.com/hub/Credit-Card-Swiper-and-Reader-for-iPhone-iPad-Blackberry-An . . . , on Apr. 20, 2011, pp. 1-2.
"Headphone Jack (3.5mm)," Retrieved from the Internet URL: http://www.phonescoop.com/glossary/term.php? gid=440, on May 5, 2011, pp. 1-1.
"Magnetic Card Reader," lekernel.net~scrapbook, Retrieved from the Internet URL: http://lekernel.net/scrapbook/old/cardreader.html, on Apr. 24, 2011, pp. 1-4.
"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164fc3 . . . , on Feb. 8, 2011, pp. 1-1.
"Magnetic stripe reader/writer," dated Dec. 11, 2009, Retrieved from the Internet URL: http://www.gae.ucm.es/-padilla/extrawork/stripe.html, on Dec. 21, 2009, pp. 1-2.
"Mag-stripe readers The hunt for a homebrew mag-stripe reader that'll work with modem," dated Jan. 21, 2009, Retrieved from the Internet URL: http://www.hak5.org/forums/index.php?showtopic=11563&st=20, on Apr. 25, 2011, pp. 1-6.
"Mobile Credit Card Payment made easy with Intuit GoPayment: Get paid on the spot from your mobile phone," Retrieved from the Internet URL: http://payments.intuit.com/products/basic-payment-solutions/mobile-credit-card-processin . . . , on Feb. 11, 2011, pp. 1-3.
"Mophie Marketplace Magnetic Strip Reader/Case for iPhone 3G & 3GS-Grey," J&R (JR.com), Retrieved from the Internet URL: http://www.jr.com/mophie/pe/MPE_MPIP3GBLK/, on Feb. 8, 2011, pp. 1-1.
"MSR500EX (Mini123EX) Portable Magnetic Stripe Card Reader," TYNER, dated Apr. 27, 2007, Retrieved from the Internet URL: http://www.tyner.com/magnetic/msr500ex.htm, on Apr. 22, 2011, pp. 1-3.
"Pay@PC," Retrieved from the Internet URL: http://www.merchantanywhere.com/PAY_AT_PCT@PC.htm, on Feb. 11, 2011, pp. 1-2.
"Reference Designations for Electrical and Electronics Parts and Equipment," Engineering Drawing and Related Documentation Practices, ASME Y14.44/2008, The American Society of Mechanical Engineers, Nov. 21, 2008, pp. 1-31.
"Semtek 3913 Insert Magnetic Card Reader 20 Pin Serial RS232," RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.
"Semtek to target healthcare with HandEra PDAs and PDA swipe card reader," dated Aug. 29, 2001, Retrieved from the Internet URL: http://www.pdacortex.com/semtek.htm, on Apr. 19, 2011, pp. 1-2.
"Touch-Pay Wireless Credit Card Processing Free—$19 Setup Fee!," MerchantSeek, Retrieved from the Internet URL: http://www.merchantseek.com/wireless-credit-card-processing.htm, on Feb. 11, 2011, pp. 1-5.

(56) References Cited

OTHER PUBLICATIONS

"Travel industry targeted for Palm PDA card reader," dated Aug. 22, 2001, Retrieved from the Internet URL: http://www.m-travel.com/news/2001/08/travel_industry.html, on Apr. 19, 2011, pp. 1-2.
"USB Magnetic Stripe Credit/Card Track-2 Reader and Writer (75/210BPI)," Deal Extreme (dealextreme.com), Nov. 15, 2008, Retrieved from the Internet URL: http://www.dealextreme.com/p/usb-magnetic-stripe-credit-debit-card-track-2-reader-and-wr . . . , on Feb. 8, 2011, pp. 1-3.
"What is a Coupling Capacitor," Retrieved from the Internet URL: http://www.learningaboutelectronics.com/Articles/What-is-a-coupling-capacitor, on Mar. 21, 2016, pp. 1-4.
Acidus, "Mag-stripe Interfacing—A Lost Art," Retrieved from the Internet URL: http://www.scribd.com/doc/18236182/Magstripe-Interfacing, on Feb. 7, 2011, pp. 1-4.
Bauer, G.R., et al., "Comparing Block Cipher Modes of Operation on MICAz Sensor Nodes," 17th Euromicro International Conference on Parallel, Distributed and Network-based Processing, 2009, Feb. 18-20, 2009, pp. 371-378.
Bourdeauducq, S., "Reading magnetic cards (almost) for free (Lekernel)," dated Jan. 26, 2009, Retrieved from the Internet URL: http://lekernel.net/blog/?p=12, on May 5, 2011, pp. 1-2.
Buttell, A.E., "Merchants eye mobile phones to transact card payments," dated Feb. 3, 2010, Retrieved from the Internet URL: http://www.merchantaccountguide.com/merchant-account-news/cell-phone-credit-card-mer . . . , on Feb. 8, 2011, pp. 1-3.
"Grandison, K., ""vTerminal Credit Card Processing App for AuthorizeNet and PayPal Payflow Pro ForCurve 8350 8500 8900 and Bold 9000 Blackberry Download in Business Tools Tag,"" dated Oct. 28, 2012, Retrieved from the Internet URL: http://www.4blackberry.net/tag/business-tools/vterminal-credit-card-processing-app-for-authorizenet-and-paypal-payflow-pro-for-curve-8350-8500-890-download-2075.html, on Mar. 30, 2015, pp. 1-4".
Guy, N., "Review: Square, Inc. Square Credit Card Reader (2013)," iLounge, dated Jan. 16, 2014, Retrieved from the Internet URL: http://www.ilounge.com/index.php/reviews/entry/square-inc.-square-credit-card-reader-2013/, on Feb. 19, 2015 , pp. 1-4.
Harris, A., "Magnetic Stripe Card Spoofer," dated Aug. 4, 2008, Retrieved from the Internet URL: http://hackaday.com/2008/08/04/magnetic-stripe-card-spoofer/, on Apr. 25, 2011, pp. 1-11.
Jones, R., "U.S. Credit Cards to get a high-tech makeover," dated Oct. 22, 2010, Retrieved from the Internet URL: http://lifeine.today.com/_news/2010/10/22/5334208-us-credit-cards-to-get-a-high-tech-mak . . . , on Feb. 8, 2011, pp. 1-8.
Kuo, Y-S., et al., "Hijacking Power and Bandwidth from the Mobile Phone's Audio Interface," Proceedings of the First ACM Symposium on Computing for Development, (DEV'10), dated Dec. 17, 2010, pp. 1-10.
Lucks, S., "Two-Pass Authenticated Encryption Faster than Generic Composition," H. Gilbert and H. Handschuh (Eds.): FSE 2005, LNCS 3557, © International Association for Cryptologic Research 2005, pp. 284-298.
Padilla, L., "Magnetic stripe reader circuit," updated Dec. 5, 2009, Retrieved from the Internet URL: http://www.gae.ucm.es/~padilla/extraworklmagamp.html, on May 5, 2011, pp. 1-7.
Padilla, L., "The simplest magnetic stripe reader," updated Dec. 10, 2009, Retrieved from the Internet URL: www.gae.ucm.esi~padilla/extrawork/soundtrack.html, on Dec. 21, 2009, pp. 1-5.
Padilla, L., "Turning your mobile into a magnetic stripe reader," updated Dec. 6, 2009, Retrieved from the Internet URL: http://www.gae.ucm.es/~padilla/extrawork/mobilesoundtrack.html, on Feb. 7, 2011, pp. 1-4.
Ryan, P., "Plug and Pay: A Gallery of 26 Mobile Card Readers," Aug. 20, 2013, Retrieved from the Internet URL: http://bankinnovation.net/2013/08/plug-and-pay-a-gallery-of-26-mobile-card-readers/, on Feb. 19, 2015, pp. 1-12.
Titlow, J.P., "ROAM pay is like Square for Blackberry (Plus Android, iOS and Desktops)," dated Dec. 1, 2010, Retrieved from the Internet URL: http://www.readwriteweb.com/biz/2010/12/roampay-is-like-square-for-bla.php, on Apr. 20, 2011, pp. 1-12.
Tracy, "Announcement: Semtek Introduces Side Swipe II Card Reader for Wireless Devices," Brighthand, dated Apr. 8, 2003, Retrieved from the Internet URL: http://forum.brighthand.com/threads/announcement-semtek-introduces-side-swipe-ii-card-reader-for-wireless-devices.173285/, on Dec. 28, 2015, pp. 1-4.
Veneziani, V., "Use a cellphone as a magnetic card reader," dated Apr. 15, 2005, Retrieved from the Internet URL: http://hackaday.com/2005/04/15/use a-cellphone-as-a-magnetic-card-reaser/, on Feb. 7, 2011, pp. 1-10.
Website: www.alexwinston.com, retrieved on May 24, 2011, pp. 1-5.
Wehner, M., "The Unofficial Apple Weblog, Square credit card reader loses weight, gains accuracy", TUAW, dated Dec. 9, 2013, Retrieved from the Internet URL: http://www.tuaw.com/2013/12/09/square-credit-card-reader-loses-weight-gains-accuracy/, on Feb. 19, 2015, p. 1.
Non-Final Office Action dated Sep. 30, 2011 for U.S. Appl. No. 12/903,753, of McKelvey, J., et al., filed Oct. 13, 2010.
Non-Final Office Action dated Sep. 30, 2011 for U.S. Appl. No. 13/010,976, of Babu, A. R., et al., filed Jan. 21, 2011.
Non-Final Office Action dated Sep. 30, 2011 for U.S. Appl. No. 13/005,822, of McKelvey, J., et al., filed Jan. 13, 2011.
Non-Final Office Action dated Oct. 7, 2011 for U.S. Appl. No. 13/043,258, of McKelvey, J., filed Mar. 8, 2011.
Non-Final Office Action dated Oct. 11, 2011 for U.S. Appl. No. 13/043,203, of McKelvey. J., et al., filed Mar. 8, 2011.
Non-Final office Action dated Oct. 11, 2011 for U.S. Appl. No. 13/043,263, of McKelvey, J., filed Mar. 8, 2011.
Final Office Action dated Jun. 12, 2012 for U.S. Appl. No. 13/010,976, of Babu, A. R., et al., filed Jan. 21, 2011.
Final Office Action dated Jul. 6, 2012 for U.S. Appl. No. 12/903,753, of McKelvey, J., et al., filed Oct. 13, 2010.
Final Office Action dated Jul. 6, 2012 for U.S. Appl. No. 13/043,203, of McKelvey. J., et al., filed Mar. 8, 2011.
Final Office Action dated Jul. 9, 2012 for U.S. Appl. No. 13/005,822, of McKelvey, J., et al., filed Jan. 13, 2011.
Schaerer, T., "Vom Fensterkomparator zum Prazisions-Schmitt-Trigger," Elektronik Kompendium, Retrieved from the Internet URL: https://web.archive.org/web/20140805054448/http://www.elektronik-kompendium.de/public/schaerer/wincst.htm, pp. 1-22 (Aug. 5, 2014).
Summons to attend oral proceedings for European Patent Application No. 16 155 374.8, mailed Mar. 5, 2019.
Non-Final Office Action dated Apr. 10, 2019, for U.S. Appl. No. 14/565,277, of Wade, J., filed Dec. 9, 2014.
Notice of Allowance dated Sep. 28, 2017, for U.S. Appl. No. 15/013,964, of Lamba, K, et al., filed Feb. 2, 2016.
Office Action for European Patent Application No. 16155374.8, dated Oct. 18, 2017.
Office Action for European Patent Application No. 11833172.7, dated Oct. 24, 2017.
Notice of Allowance dated Jan. 18, 2018, for U.S. Appl. No. 15/066,496, of Babu, A., et al., filed Mar. 10, 2016.
Final Office Action dated Jan. 22, 2018, for U.S. Appl. No. 14/284,218, of Nguyen, A., et al., filed May 21, 2014.
Final Office Action dated Jan. 29, 2018, for U.S. Appl. No. 15/252,033, of Lamba, K, et al., filed Aug. 30, 2016.
Corrected Notice of Allowance dated Feb. 9, 2018, for U.S. Appl. No. 15/066,496, of Babu, A., et al., filed Mar. 10, 2016.
Certificate of Industrial Design Registration for Canadian Design Application No. 166511, mailed Feb. 27, 2017 [Design Registration No. 166511].
Certificate of Industrial Design Registration for Canadian Design Application No. 159528, mailed Feb. 27, 2017.
Notice of Allowance for Canadian Patent Application No. 2,932,849, dated Mar. 27, 2017.
Corrected Notice of Allowance dated Apr. 10, 2017, for U.S. Appl. No. 14/985,624, of Wade, J., et al., filed Dec. 31, 2015.
Notice of Allowance dated May 5, 2017, for U.S. Appl. No. 14/312,524, of Edwards, T., filed Jun. 23, 2014.
Non-Final Office Action dated May 8, 2017, for U.S. Appl. No. 15/013,964, of Lamba, K., et al., filed Feb. 2, 2016.

(56) References Cited

OTHER PUBLICATIONS

Notice of Allowance dated Jun. 22, 2017, for U.S. Appl. No. 14/463,455, of Skoog, L., filed Aug. 19, 2014.
Non-Final Office Action dated Jun. 29, 2017, for U.S. Appl. No. 14/284,218, of Nguyen, A., et al., filed May 21, 2014.
Non-Final Office Action dated Jul. 28, 2017, for U.S. Appl. No. 15/252,033, of Lamba, K., et al., filed Aug. 30, 2016.
English-language translation of First Office Action and Search for Chinese Patent Application No. 201510109013.7, dated Sep. 5, 2017.
Ex Parte Quayle Action mailed Sep. 8, 2017, for U.S. Appl. No. 15/066,496, of Babu, A., et al., filed Mar. 10, 2016.
International Search Report and Written Opinion, for PCT Application No. PCT/US2010/052481, dated Jun. 23, 2011.
International Search Report and Written Opinion, for PCT Application No. PCT/US2011/055386, dated Feb. 22, 2012.
European Search Report and Opinion, for European Application No. 11833172.7, dated Apr. 22, 2014.
International Search Report and Written Opinion, for PCT Application No. PCT/US2010/052483, dated Jun. 10, 2011.
International Search Report and Written Opinion, for PCT Application No. PCT/US2014/067074, dated Mar. 10, 2015.
International Search Report and Written Opinion, for PCT Application No. PCT/US2014/069788, dated May 14, 2015.
International Search Report and Written Opinion, for PCT Application No. PCT/US2012/064782, dated Feb. 26, 2013.
Extended European Search Report for European Patent Application No. 16155374.8, dated Oct. 11, 2016.
International Search Report and Written Opinion, for PCT Application No. PCT/US2015/045772, dated Nov. 6, 2015.
Non-Final Office Action dated Sep. 11, 2014 for U.S. Appl. No. 13/298,510, of Lamba, K. et al., filed Nov. 17, 2011.
Non-Final Office Action dated Oct. 7, 2014 for U.S. Appl. No. 13/298,534, of Lamba, K., et al., filed Nov. 17, 2011.
Notice of Allowance dated Oct. 17, 2014 for U.S. Appl. No. 14/220,967, of Wade, J., et al., filed Mar. 20, 2014.
Certificate of Design Registration for European Patent Application No. 002578674, mailed Nov. 14, 2014 (Registration No. 002578674-0001).
Notice of Allowance dated Nov. 25, 2014 for U.S. Appl. No. 14/231,598, of Claude, J.B., et al., filed Mar. 31, 2014.
Notification of Registration of a Design for Australian Application No. 201415781, mailed Nov. 27, 2014 (Registration No. 359005).
Notice of Allowance dated Dec. 18, 2014 for U.S. Appl. No. 14/220,967, of Wade, J., et al., filed Mar. 20, 2014.
Notice of Allowance dated Dec. 24, 2014 for U.S. Appl. No. 13/010,976, of Babu, A. R., et al., filed Jan. 21, 2011.
Non-Final Office Action dated Jan. 20, 2015 for U.S. Appl. No. 14/012,655, of McKelvey, J., filed Aug. 28, 2013.
Final Office Action dated Jan. 28, 2015 for U.S. Appl. No. 13/298,560, of Lamba K. et al., filed Nov. 17, 2011.
Final Office Action dated Feb. 4, 2015 for U.S. Appl. No. 13/298,491, of Lamba, K., et al., filed Nov. 17, 2011.
First Examination Report for Indian Design Application No. 267386, dated Feb. 5, 2015.
Non-Final Office Action dated Feb. 20, 2015 for U.S. Appl. No. 14/512,104, of Templeton, T., et al., filed Oct. 10, 2014.
English-language translation of Decision of Final Rejection for Japanese Patent Application No. 2013-533897, dated Feb. 23, 2015.
Examination Report No. 1 for Australian Application No. 201415781, dated Feb. 23, 2015 (Registration No. 359005).
Examination Report for Canadian Application No. 2,812,594, dated Feb. 24, 2015.
Final Office Action dated Mar. 18, 2015 for U.S. Appl. No. 13/298,487, of Lamba, K, et al., filed Nov. 17, 2011.
English-language translation of Notice of Reasons for Rejection for Japanese Application No. 2014-025525, dated Mar. 31, 2015.
Final Office Action dated Apr. 8, 2015 for U.S. Appl. No. 13/298,534, of Lamba, K., et al., filed Nov. 17, 2011.
Advisory Action dated Apr. 9, 2015 for U.S. Appl. No. 13/298,560, of Lamba K et al., filed Nov. 17, 2011.
Non-Final Office Action dated Apr. 10, 2015 for U.S. Appl. No. 14/189,997, of Lamfalusi, M., et al., filed Feb. 25, 2014.
Final Office Action dated May 6, 2015 for U.S. Appl. No. 13/298,501, of Babu, A., et al., filed Nov. 17, 2011.
Final Office Action dated May 6, 2015 for U.S. Appl. No. 13/298,506, of Lamba, K., et al., filed Nov. 17, 2011.
Final Office Action dated May 6, 2015 for U.S. Appl. No. 13/298,510, of Lamba, K. et al., filed Nov. 17, 2011.
Notice of Allowance dated May 19, 2015 for U.S. Appl. No. 14/620,765, of Wade, J., et al., filed Feb. 12, 2015.
Non-Final Office Action dated May 26, 2015 for U.S. Appl. No. 14/551,681, of Wade, J., et al., filed Nov. 24, 2014.
Notice of Allowance dated Jun. 10, 2015, for U.S. Appl. No. 29/491,147, of Templeton T., et al., filed May 16, 2014.
Notice of Allowance dated Jun. 22, 2015 for U.S. Appl. No. 13/298,491, of Lamba, K., et al., filed Nov. 17, 2011.
Non-Final Office Action dated Jun. 22, 2015 for U.S. Appl. No. 14/322,815, of Edwards, T., filed Jul. 2, 2014.
Application for Registration of an Industrial Design Examiner's Report for Canadian Design Application No. 159528, mailed Jun. 11, 2015.
Non-Final Office Action dated Jul. 6, 2015 for U.S. Appl. No. 13/298,534, of Lamba K. et al., filed Nov. 17, 2011.
Certificate of Registration of Design for Indian Design Application No. 267386 issued Jul. 7, 2015, (Registration No. 39149).
Non-Final Office Action dated Jul. 16, 2015 for U.S. Appl. No. 13/298,560, of Lamba K. et al., filed Nov. 17, 2011.
Office Action for European Patent Application No. 11 786 731.7, dated Jul. 16, 2015.
Non-Final Office Action dated Jul. 27, 2015 for U.S. Appl. No. 29/493,212, of Edwards, T., et al., filed Jun. 6, 2014.
Examination Report No. 2 for Australian Application No. 201415781, dated Aug. 13, 2015 (Registration No. 359005).
Notice of Allowance dated Aug. 27, 2015, for U.S. Appl. No. 13/298,501, of Babu, A., et al., filed Nov. 17, 2011.
Notice of Allowance dated Aug. 28, 2015 for U.S. Appl. No. 13/298,510, of Lamba, K. et al., filed Nov. 17, 2011.
Notice of Allowance dated Sep. 1, 2015 for U.S. Appl. No. 13/298,487, of Lamba, K., et al., filed Nov. 17, 2011.
Notice of Allowance dated Sep. 2, 2015 for U.S. Appl. No. 14/578,107, of Wade, J. et al., filed Dec. 19, 2014.
Advisory Action dated Sep. 11, 2015 for U.S. Appl. No. 13/298,506, of Lamba, K., et al., filed Nov. 17, 2011.
Notice of Allowance dated Sep. 16, 2015 for U.S. Appl. No. 14/551,681, of Wade, J., et al., filed Nov. 24, 2014.
Notice of Allowance dated Oct. 5, 2015 for U.S. Appl. No. 14/322,815, of Edwards, T., filed Jul. 2, 2014.
Notice of Allowance dated Oct. 6, 2015 for U.S. Appl. No. 13/298,491, of Lamba, K., et al., filed Nov. 17, 2011.
Notice of Allowance dated Oct. 7, 2015 for U.S. Appl. No. 13/298,510, of Lamba, K., et al., filed Nov. 17, 2011.
Notice of Allowance dated Oct. 8, 2015 for U.S. Appl. No. 13/298,487, of Lamba, K., et al., filed Nov. 17, 2011.
Notice of Allowance dated Oct. 13, 2015 for U.S. Appl. No. 14/578,107, of Wade, J., et al., filed Dec. 19, 2014.
English-language translation of Final Rejection for Japanese Application No. 2014-025525, dated Oct. 20, 2015.
Non-Final Office Action dated Oct. 29, 2015 for U.S. Appl. No. 14/512,104, of Templeton, T., et al., filed Oct. 10, 2014.
Notice of Allowance dated Nov. 13, 2015 for U.S. Appl. No. 13/298,487, of Lamba, K., et al., filed Nov. 17, 2011.
Corrected Notice of Allowance dated Nov. 18, 2015, for U.S. Appl. No. 14/578,107, of Wade, J., et al., filed Dec. 19, 2014.
Notice of Allowance dated Nov. 19, 2015 for U.S. Appl. No. 13/298,491, of Lamba, K., et al., filed Nov. 17, 2011.
Corrected Notice of Allowance dated Nov. 19, 2015 for U.S. Appl. No. 13/298,510, of Lamba, K., et al., filed Nov. 17, 2011.
Notice of Allowance dated Nov. 20, 2015 for U.S. Appl. No. 13/298,501, of Babu, A., et al., filed Nov. 17, 2011.
Ex parte Quayle Action mailed Nov. 20, 2015 for U.S. Appl. No. 14/620,699, of Wade, J., et al., filed Feb. 12, 2015.

(56) References Cited

OTHER PUBLICATIONS

Notice of Allowance dated Nov. 23, 2015 for U.S. Appl. No. 14/189,997, of Lamfalusi, M., et al., filed Feb. 25, 2014.
Examinees Report for Canadian Industrial Design Application No. 159528, dated Dec. 1, 2015.
Non-Final Office Action dated Dec. 14, 2015 for U.S. Appl. No. 13/298,506, of Lamba, K, et al., filed Nov. 17, 2011.
Notice of Allowance dated Jan. 12, 2016, for U.S. Appl. No. 13/298,534, of Lamba, K., et al., filed Nov. 17, 2011.
Final Office Action dated Jan. 15, 2016, for U.S. Appl. No. 29/493,212, of Edwards, T., et al., filed Jun. 6, 2014.
Notice of Allowance dated Jan. 29, 2016, for U.S. Appl. No. 13/298,501, of Babu, A., et al., filed Nov. 17, 2011.
Notice of Allowance dated Jan. 29, 2016, for U.S. Appl. No. 13/298,534, of Lamba, K, et al., filed Nov. 17, 2011.
Final Office Action dated Feb. 1, 2016, for U.S. Appl. No. 13/298,560, of Lamba, K., et al., filed Nov. 17, 2011.
Notice of Allowance dated Feb. 5, 2016, for U.S. Appl. No. 14/620,699, of Wade, J., et al., filed Feb. 12, 2015.
Non-Final Office Action dated Feb. 25, 2016, for U.S. Appl. No. 14/979,407, of Lamfalusi, M., et al., filed Dec. 27, 2015.
Examiner Requisition for Canadian Application No. 2,812,594, dated Feb. 26, 2016.
Non-Final Office Action dated Mar. 1, 2016, for U.S. Appl. No. 14/942,515, of Lamba, K., et al., filed Nov. 16, 2015.
Office Action for Canadian Patent Application No. 2,920,589, dated Mar. 11, 2016.
Notice of Allowance dated Mar. 28, 2016, for Design U.S. Appl. No. 29/493,212, of Edwards, T., et al., filed Jun. 6, 2014.
Non-Final Office Action dated Apr. 7, 2016, for U.S. Appl. No. 13/298,506, of Lamba, K., et al., filed Nov. 17, 2011.
Advisory Action dated Apr. 14, 2016, for U.S. Appl. No. 13/298,560, of Lamba, K., et al., filed Nov. 17, 2011.
Non-Final Office Action dated May 5, 2016, for U.S. Appl. No. 14/306,041, of Wade, J., et al., filed Jun. 16, 2014.
Non-Final Office Action dated May 6, 2016, for U.S. Appl. No. 14/512,104, of Templeton, T., et al., filed Oct. 10, 2014.
Notice of Allowance dated May 10, 2016, for U.S. Appl. No. 14/942,515, of Lamba, K., et al., filed Nov. 16, 2015.
Non-Final Office Action dated May 19, 2016, for U.S. Appl. No. 13/298,560, of Lamba, K., et al., filed Nov. 17, 2011.
Office Action for European Patent Application No. 11 833 172.7, dated May 17, 2016.
Notice of Allowance dated Jun. 3, 2016, for U.S. Appl. No. 14/942,515, of Lamba, K., et al., filed Nov. 16, 2015.
Notice of Allowance dated Jun. 13, 2016, for U.S. Appl. No. 14/979,407, of Lamfalusi, M., et al., filed Dec. 27, 2015.
Notice of Allowance dated Jun. 14, 2016, for U.S. Appl. No. 14/942,515, of Lamba, K., et al., filed Nov. 16, 2015.
Non-Final Office Action dated Jun. 30, 2016 for U.S. Appl. No. 15/066,496, of Babu, A., et al., filed Mar. 10, 2016.
Notice of Acceptance for Australian Patent Application No. 2014362287, dated Jun. 30, 2016.
Non-Final Office Action dated Jul. 1, 2016, for U.S. Appl. No. 15/013,937, of Lamba, K., et al., filed Feb. 2, 2016.
Office Action for Canadian Patent Application No. 2,932,849, dated Jul. 13, 2016.
Non-Final Office Action dated Aug. 16, 2016, for U.S. Appl. No. 14/312,524, of Edwards, T., filed Jun. 23, 2014.
Notice of Allowance dated Jul. 14, 2016, for U.S. Appl. No. 14/942,515, of Lamba, K., et al., filed Nov. 16, 2015.
Non-Final Office Action dated Aug. 17, 2016, for U.S. Appl. No. 14/985,624, of Wade, J., et al., filed Dec. 31, 2015.
Notice of Allowance dated Aug. 26, 2016, for U.S. Appl. No. 13/298,506, of Lamba, K., et al., filed Nov. 17, 2011.
Notice of Allowance for Canadian Patent Application No. 2,920,589, dated Sep. 21, 2016.
Notice of Allowance dated Sep. 22, 2016, for U.S. Appl. No. 13/298,506, of Lamba, K, et al., filed Nov. 17, 2011.
Notice of Allowance dated Sep. 27, 2016, for U.S. Appl. No. 14/306,041, of Wade, J., et al., filed Jun. 16, 2014.
Notice of Allowance dated Oct. 7, 2016, for U.S. Appl. No. 14/512,104, of Templeton, T., et al., filed Oct. 10, 2014.
Notice of Allowance dated Oct. 26, 2016, for U.S. Appl. No. 15/013,937, of Lamba, K, et al., filed Feb. 2, 2016.
Corrected Notice of Allowance dated Nov. 1, 2016, for U.S. Appl. No. 14/512,104, of Templeton, T., et al., filed Oct. 10, 2014.
Final Office Action dated Nov. 3, 2016, for U.S. Appl. No. 13/298,560, of Lamba, K., et al., filed Nov. 17, 2011.
Notice of Allowance dated Dec. 19, 2016, for U.S. Appl. No. 14/306,041, of Wade, J., filed Jun. 16, 2014.
Notice of Allowance dated Jan. 12, 2017, for U.S. Appl. No. 14/985,624, of Wade, J., et al., filed Dec. 31, 2015.
Non-Final Office Action dated Jan. 17, 2017, for U.S. Appl. No. 14/463,455, of Skoog, L., filed Aug. 19, 2014.
Non-Final Office Action dated Feb. 15, 2017, for U.S. Appl. No. 15/066,496, of Babu, A., et al., filed Mar. 10, 2016.
Advisory Action dated Feb. 21, 2017, for U.S. Appl. No. 13/298,560, of Lamba K, et al., filed Nov. 17, 2011.
Final Office Action dated Feb. 23, 2017, for U.S. Appl. No. 14/312,524, of Edwards, T., filed Jun. 23, 2014.
Notice of Allowance dated Jul. 3, 2019, for U.S. Appl. No. 13/652,365, of Behren, R.V., et al., filed Oct. 15, 2012.
Final Office Action dated Sep. 9, 2019, for U.S. Appl. No. 14/565,277, of Wade, J., filed Dec. 9, 2014.

\* cited by examiner

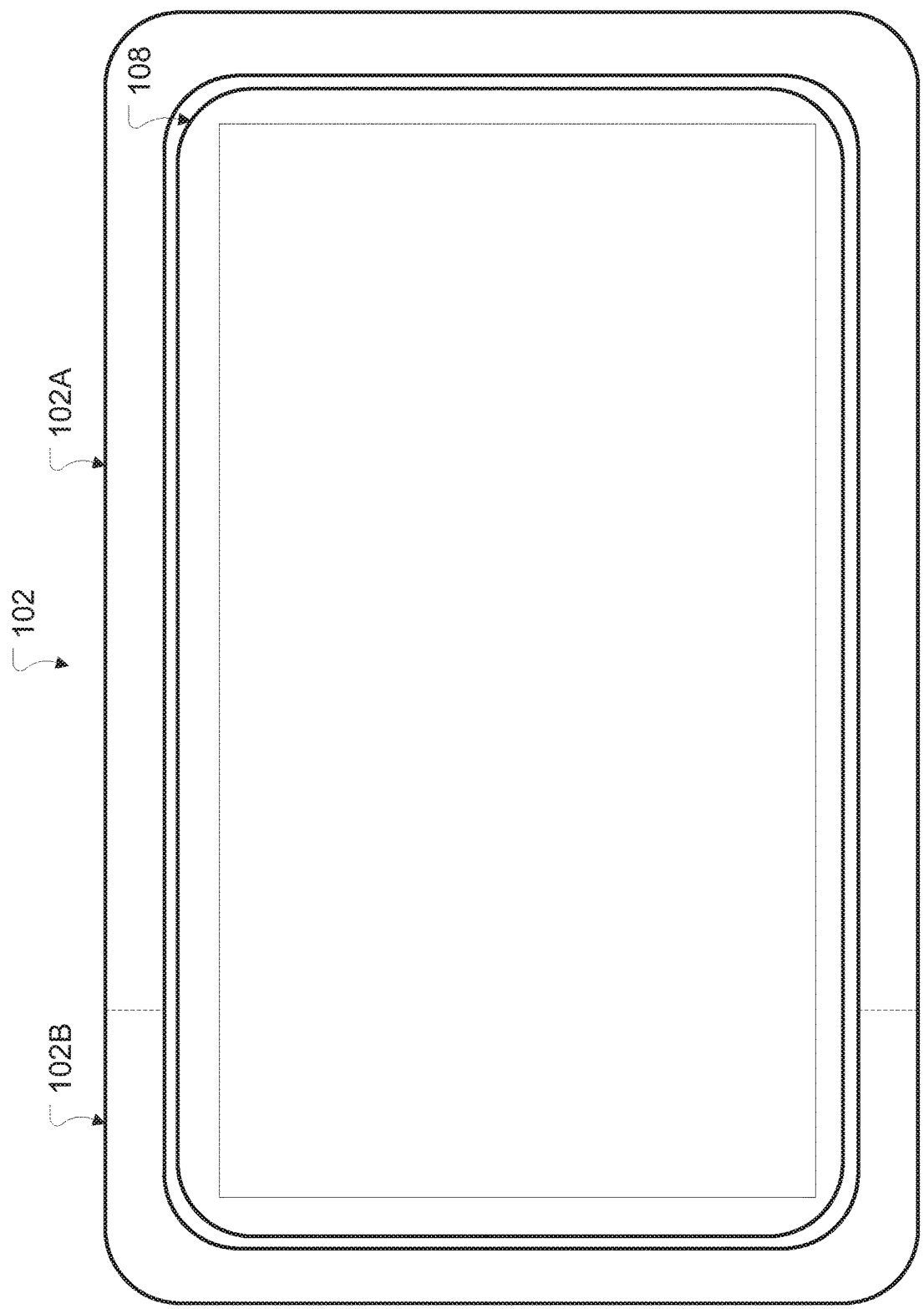

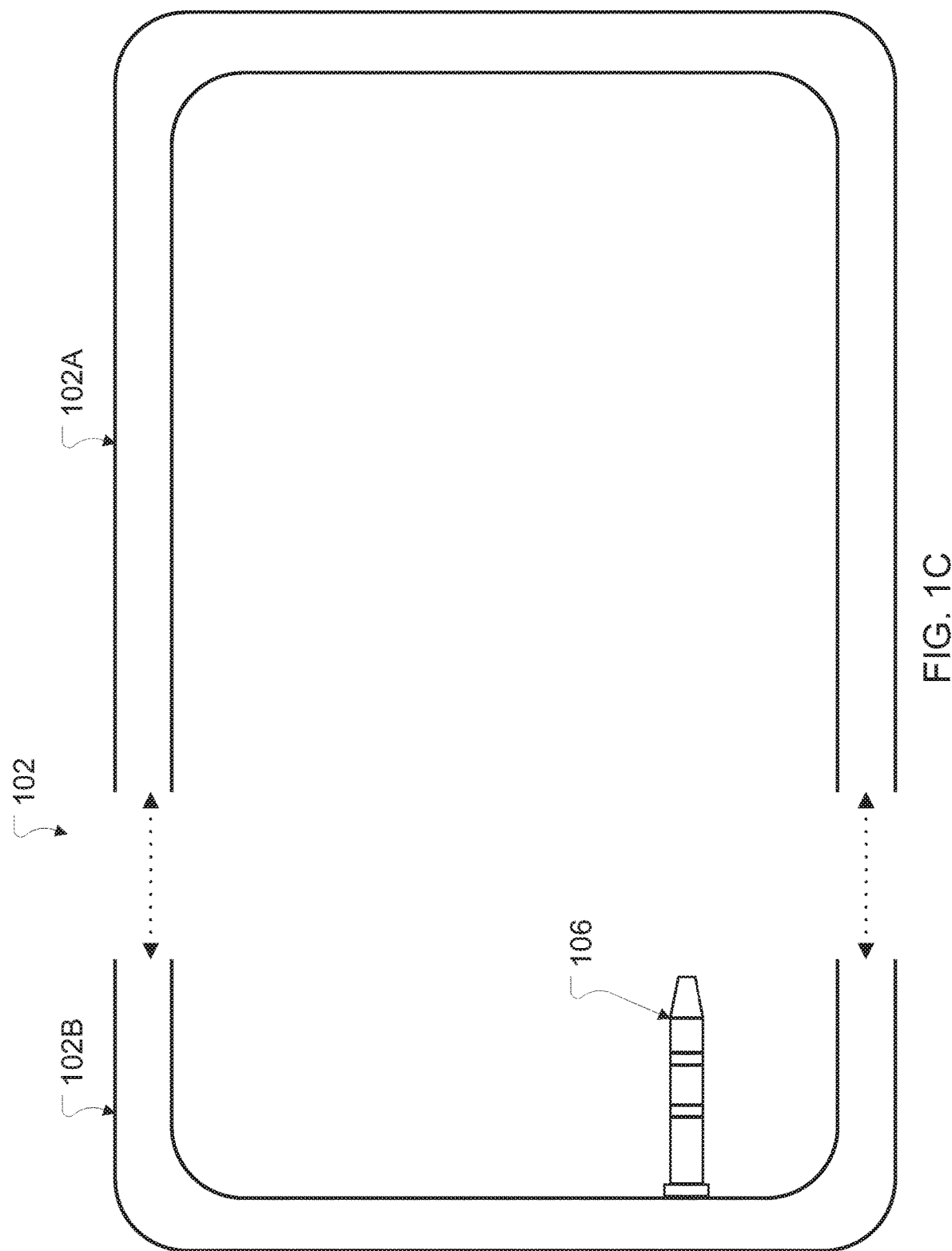

DISPLACEABLE CARD READER CIRCUITRY

CROSS-REFERENCE TO RELATED APPLICATIONS

This application is a continuation of U.S. patent application Ser. No. 14/312,524, entitled "TERMINAL CASE WITH INTEGRATED DUAL READER STACK", filed on Jun. 23, 2014; which is hereby expressly incorporated herein by reference in its entirety.

BACKGROUND

1. Technical Field

The subject application relates to a case for a mobile point of sale (POS) terminal and in particular, to a case for a mobile device that includes multiple card reader devices configured for reading different payment card formats.

2. Introduction

The increasing prevalence of mobile computing devices, such as smart phones and tablet computers, has spurned an increase in popularity for protective carrying cases. While some cases provide mechanical functionality, such as protective or carrying features, most conventional cases do not provide hardware enhancements or offer expanded communication functionality.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

FIG. 1A illustrates an example of a front perspective view of a case of the subject technology, as used with a mobile computing device, according to some aspects.

FIG. 1C illustrates an example of a front perspective view of a case of the subject technology (without a mobile computing device), according to some implementations of the technology.

DETAILED DESCRIPTION

Figure 1B:
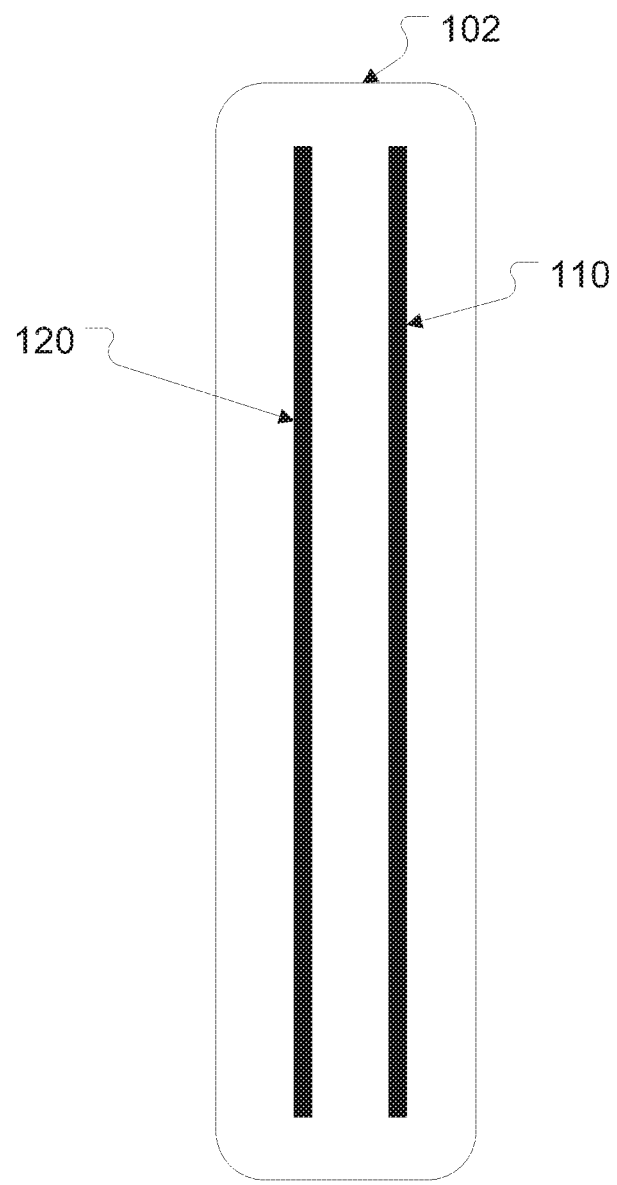
FIG. 1B illustrates an example of an end perspective view of a case which includes multiple slots for reading payment cards of different formats, according to some implementations of the technology.

The detailed description set forth below is intended as a description of various configurations of the subject technology and is not intended to represent the only configurations in which the technology can be practiced. The appended drawings are incorporated herein and constitute a part of the detailed description, which includes specific details for the purpose of providing a more thorough understanding of the subject technology. However, it will be clear and apparent that the subject technology is not limited to the specific details set forth herein and may be practiced without these specific details. In some instances, structures and components are shown in block diagram form in order to avoid obscuring the concepts of the subject technology.

The subject technology relates to a multi-purpose card reader device (e.g., a stacked card reader) configured to accept payment cards of different formats. Specifically, a stacked card reader of the subject technology provides multiple hardware modules configured for reading financial information from different payment card types, such as magnetic stripe payment cards and/or integrated circuit (IC) type payment cards. Financial information read by the stacked card reader is provided to a mobile host device, such as a mobile computer or tablet device, etc., for use in facilitating a financial transaction between a buyer and a seller.

A stacked card reader of the subject technology can be implemented either as an attachable peripheral device (e.g., that is attachable to a mobile host), or mechanically integrated into a case that is configured for cooperation around the mobile host. In aspects where the card reader is integrated within a case, the case can include different numbers of parts (or pieces) that fit around one or more edges of the enclosed mobile device. In some implementations, the case includes two portions, i.e., a "body" portion, and a "base" portion.

As discussed in further detail below, a case of the subject technology (which includes an integrated stacked card reader) can include a communication channel that provides an electrical coupling to the mobile device. For example, a communication channel coupled to the stacked card reader can be configured to provide signaling to the host device via a protruding plug or audio jack, such as a headphone jack. As such, the case, together with the integrated stacked card reader, can be used to expand functionality of the mobile device so that the unit can function as a versatile mobile point of sale (POS) terminal, capable of receiving payment cards of different formats, such as magnetic stripe payment cards and integrated circuit payment cards.

Physical integration of the card reader (e.g., card reader hardware and circuitry) in the case can vary depending on case design. In certain aspects, the card reader can be integrated into a base of the case that mechanically couples with a larger portion, e.g., a body portion, to retain/cover or surround edges of a tablet computer or smartphone device. In another implementation, the body portion and the base portion may be substantially similar in size, such that each individual portion comprises approximately half of the overall size of the case. Additionally, in yet another implementation, the case can include a single piece, e.g., one contiguous portion. In such implementations, and audio plug protruding inward from the case may be configured to permit the plug to swivel/rotate in a manner that allows the plug to connect with a corresponding headphone port of the mobile device inserted into the case. It is understood that in different implementations, the card reader can be differently disposed within the case; for example, the card reader can be placed in a larger (body) portion, whereas a smaller (base) portion may contain no reader hardware or circuitry.

In order to provide financial payment card information to the mobile host, the stacked card reader is coupled to a communication channel which can include a protruding segment configured for insertion into an audio port (headphone port) of the mobile host device. In certain aspects, the protruding segment of the connector is configured in a tip-ring-ring-sleeve (TRRS) configuration, for example, such as that of a 3.5 mm audio jack or plug that includes left and right audio channels, as well as a microphone channel. In certain aspects, a low-profile form factor for the case may be implemented, wherein the TRRS connector is connected to the stacked reader using a modified (shortened) base portion.

FIG. 1A illustrates an example of an implementation of an assembled case 102 of the subject technology which contains a mobile device 108. The assembled case 102 includes an integrated stacked card reader (not illustrated). As implemented in the example of FIG. 1A, assembled case 102 includes two separable portions: body portion (body) 102A, and a base portion (base) 102B.

The mechanical coupling of body 102A with base 102B forms assembled case 102, which surrounds mobile device 108. A stacked reader device contained within assembled case 102 can be electrically/communicatively coupled with mobile device 108 using a protruding plug (not illustrated), e.g., to facilitate the transfer of financial information from the stacked reader to the mobile device. Although different types of plugs/connectors may be used to facilitate information transfer between the stacked reader device and mobile device 108, it is understood that aspects of the subject technology is not restricted to a particular type of communication channel or bus. By way of example, a communication channel between mobile device 108 and reader circuitry contained within case 102 can be accomplished using any of: a Universal Serial Bus (USB), an audio channel (e.g., a 3.5 mm audio plug), FireWire, a High Performance Parallel Interface (HIPPI), a Lightening connector, or a dock connector (e.g., a 30-pin dock connector), etc.

FIG. 1B illustrates an example of an end perspective view of case 102 which first card slot 110 and second card slot 120 are depicted. It is understood that first card slot 110 and second card slot 120 are not limited to an end position on case 102 and can be placed on any portion of the case, depending on the desired implementation. For example, first card slot 110 and second card slot 120 can be disposed either on body 102A, or base 102B. Similarly, first card slot 110 and second card slot 120 can be provided in different orientations with respect to case 102, such as on a front side of case 102, so that the card slots face outward or upward relative to a direction of the mobile device screen.

First card slot 110 and second card slot 120 provide physical openings into which financial payment cards can be swiped (or inserted/dipped) for reading by stacked card reader circuitry in case 102. It is understood that various card reader circuitry implementations can be realized without departing from the scope of the technology. For example, first slot 110 can be configured to receive a magnetic stripe payment card and to facilitate reading of the magnetic stripe payment card by the integrated card reader. Similarly, second card slot 120 can be configured as a dip-slot and implemented to facilitate reading of an integrated circuit (IC) card by the reader circuitry, e.g., a financial payment card that conforms to the Europay MasterCard and Visa (EMV) global standard.

In operation, first card slot 110 and second card slot 120 are configured to receive payment cards of different format types such that each of the card slots facilitate the physical swiping/dipping of a financial payment card of a different type/format. When combined in the manner depicted by the example of FIG. 1B, a mobile device (such as a tablet computer or smart phone) may be used as a mobile POS terminal configured to accept different payment card formats.

In one example implementation, first card slot 110 is integrated with a magnetic stripe read module (e.g., first read circuitry), whereas second card slot 120 is integrated with an integrated circuit read module (e.g., second read circuitry). By having first card slot 110 and second card slot 120 disposed on case 102 in a parallel configuration, the respective first read circuitry and second read circuitry can be arranged to share common electrical components, e.g., in a stacked layout. For example, the first read circuitry and second read circuitry can be arranged in a PCB layout such that respective circuitry for reach read module is positioned on a different side of the PCB, e.g., in a "stacked" configuration. As a result, the card reader circuitry of the subject technology can be implemented with a smaller form factor, as compared to designs in which separate (unstacked) reader circuitry is used for reading cards of different formats/types.

It is understood that the use of card slots on case 102 can be differently configured, depending on implementation. For example, a single slot may be used, whereby different areas of the single slot correspond with receptacles for different card types. In such an implementation, a single (longer) slot may be used for receiving a magnetic stripe card, and a portion of the slot marked to indicate an area where the dip-slot is located. For example, an IC type payment card can be inserted into the same slot, in a direction perpendicular to that of the direction of the card swipe for a magnetic stripe payment card.

FIG. 1C illustrates an example of case 102 in which body 102A and base 102B are separated and wherein mobile device 108 is omitted. As illustrated in the example of FIG. 1C, case 102 includes protruding plug 106, which provides a communication channel between the stacked reader circuitry and a host computing device, e.g., mobile device 108 of FIG. 1A. Although plug 106 illustrated in the example of FIG. 1C is a 3.5 mm audio jack, it is understood that various types of communication devices/channels may be used to facilitate information exchange between the stacked reader circuitry and the host mobile device. By way of example, other wired communication buses may be used, such as a Universal Serial Bus (USB) type adaptor, 32-pin connector or Lightening connector, etc. In other embodiments, one or more wireless devices or radios (such as Bluetooth or Bluetooth low-energy devices) may be used to facilitate information exchange between the stacked reader circuitry and the mobile electronic device.

In operation, a communicative coupling is formed between the stacked reader circuitry of case 102 and the host mobile device when plug 106 is physical coupled with the host mobile device 108, for example, upon insertion of plug 106 into the host mobile device 108. As shown in this example, the complete fitting of case 102 onto host mobile device 108 includes the mechanical integration of base 102B with body 102A.

Figure 2:
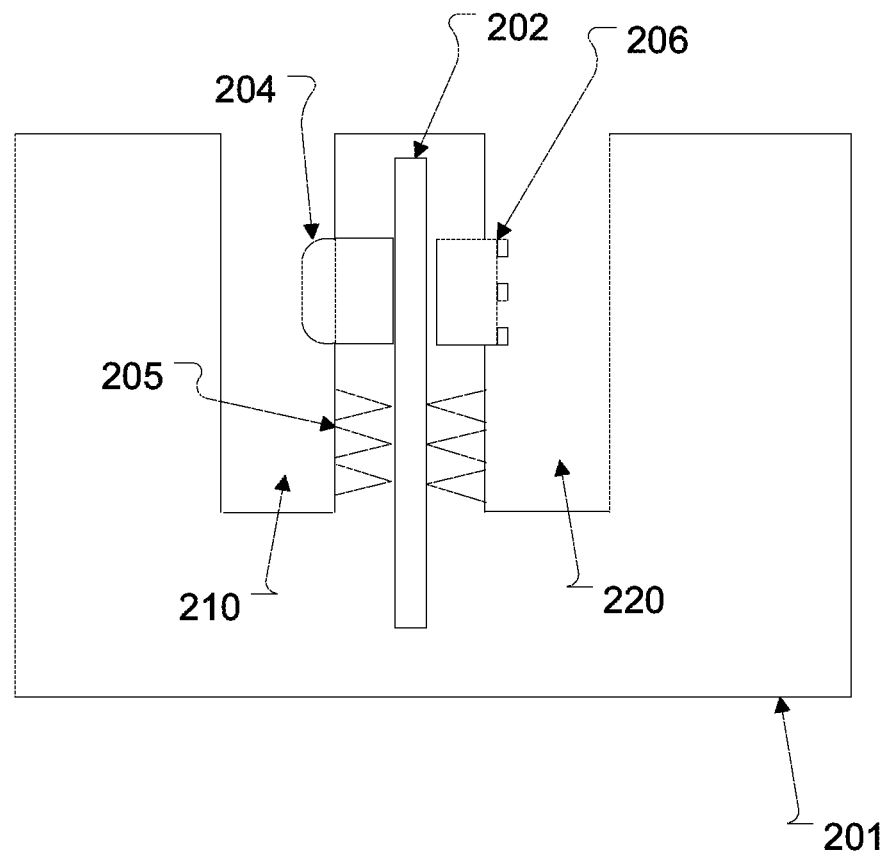
FIG. 2 depicts a side view of an example stacked card reader, according to some aspects of the technology.

FIG. 2 illustrates an example implementation of a stacked card reader 200, according to aspects of the subject technology. Specifically, FIG. 2 illustrates a side cut-away perspective view of stacked card reader 200, which is integrated into surrounding case 201, e.g., with first card slot 210 and second card slot 220. As illustrated, card reader 200 includes PCB/controller 202, magnetic stripe read module 204, displacement mechanism 205, and integrated circuit (IC) read module 206.

Although magnetic stripe read module 204 and IC read module 206 can be differently configured depending on implementation; in the illustrated example, magnetic stripe read module 204 represents a magnetic element, such as a magnetic read head, configured for producing a time-varying voltage signal upon the proximate passage of a magnetic stripe (e.g., of a magnetic stripe payment card). Similarly, IC read module 206 is configured to use a contact element such as projections or a read-pad etc., for forming electrical contact with an embedded chip (integrated circuit) of a payment card, such as that conforming to the Europay MasterCard and Visa (EMV) global standard, as discussed above.

In some embodiments the first card slot, stacked reader circuitry, and the second card slot are aligned in the same geometric plane such that a cross section of a portion of the device would expose portions of the first card slot the stacked reader circuitry, and the second card slot. In some embodiments, the magnetic element for reading a magnetic strip of a payment card and the contact element for reading the IC card can also be located in substantially the same geometric plane.

Additionally, in the illustrated example, PCB/controller 202 represents a printed circuit board (PCB) with an integrated controller (e.g., microprocessor) for use in controlling operation of magnetic stripe read module 204 and IC read module 206. In certain aspects, PCB/controller 202 is coupled to a smart phone (not illustrated), for example via an audio channel, such as audio plug 106, discussed above.

Although magnetic stripe read module 204 and IC read module 206 are illustrated as 'stacked' around PCB/controller 202, it is understood that functionality provided by PCB/controller 202 can be provided in other hardware modules residing separate from magnetic stripe read module 204 and IC read module 206. That is, PCB/controller 202 is not necessary for certain implementations of the technology that implement a stacked configuration of magnetic stripe read module 204 and IC read module 206. For example, magnetic stripe read module 204 and IC read module 206 can be similarly stacked around an electronically functionless (i.e., dumb) tray or other electronically functionless mount, without departing from the scope of the subject technology.

By way of further example, a controller (or other electronic functionality of PCB/controller 202) can be provided by hardware modules residing in other portions of card reader 200, such as in surrounding case 201. In some aspects, such hardware modules are connected to magnetic stripe read module 204 and/or IC read module 206, for example, via a control bus or using a flex cable.

In some implementations, PCB/controller 202 is configured such that magnetic stripe read module 204 and IC read module 206 can be coupled (both electrically and physically) to opposite sides of PCB 202, e.g., a first surface and a second surface. In this configuration, magnetic stripe read module 204 and IC read module 206 are "stacked" for example, to enable integration with corresponding first card slot 210 and second card slot 220. The configuration of PCB 202 and the read modules (204, 206) facilitates the sharing of electrical componentry (e.g., use of controllers and/or microprocessors), in stacked card reader 200. As a result, stacked card reader 200 can be implemented using a smaller form factor than would be possible should the respective read modules (204, 206) be implemented using separate PCBs and/or controllers.

It is understood that other read module configurations can be implemented with PCB 202. For example, stacked reader circuitry on PCB 202 can be configured such that it is mechanically loaded (e.g., spring loaded) using displacement mechanism 205, such that insertion of a payment card, in either first card slot 210 or second card slot 220, causes a physical bias of the PCB assembly in an opposite direction away from its neutral position, thereby permitting insertion of a payment card in a respective card slot. By way of example, an IC payment card inserted into second card slot 220 causes physical displacement of PCB 202 (e.g., in a direction of first card slot 210) away from its neutral position, such that simultaneous insertion of a different payment card into first card slot 210 is inhibited. When a payment card is removed the stacked reader circuitry can return to its neutral position.

In another aspect, read modules 204, 206 can be coupled to the same side of PCB 202, such as the first surface (or the second surface) of PCB 202. In such implementations, a magnetic read head of magnetic stripe read module 205 can be configured to pass through PCB 202, upon displacement of the read head caused by the passage of a magnetic stripe payment card. In such configurations, a size of stacked card reader 200 can be further reduced, for example, by at least the thickness of PCB 202, due to the fact that the read head of magnetic stripe read module 206 can pass through PCB 202.

A reduced form factor of the card reader, due to the 'stacked' configuration of read modules (204, 206) can improve security of the device, for example, by reducing an amount of room around the reader circuitry that may be used to tamper with the device. Additionally, in some aspects, PCB 202 can be constructed of stacked copper layers including one or more anti-tamper mesh portions (e.g., disposed on an outer layer of PCB 202), to prevent malicious interference with PCB 202, for example, by drilling down into the PCB to attach additional wires.

In practice, read modules (204, 206) and PCB 202 can be configured such that the entire assembly shifts upon insertion of a financial payment card into either first card slot 210, or second card slot 220. For example, a magnetic stripe payment card inserted into first card slot 210 causes PCB 202 (and consequently IC read module 206) to be biased (to the right) to permit passage of the payment card past magnetic stripe read module 204. The configuration of the surrounding case provides support for movement of the assembly. In some configurations in which read modules 204 and 206 are movable, the form factor of the entire stacked card reader 200 assembly may be further reduced in size, for example, to permit the insertion/swiping of one payment card at a time.

Figure 3:
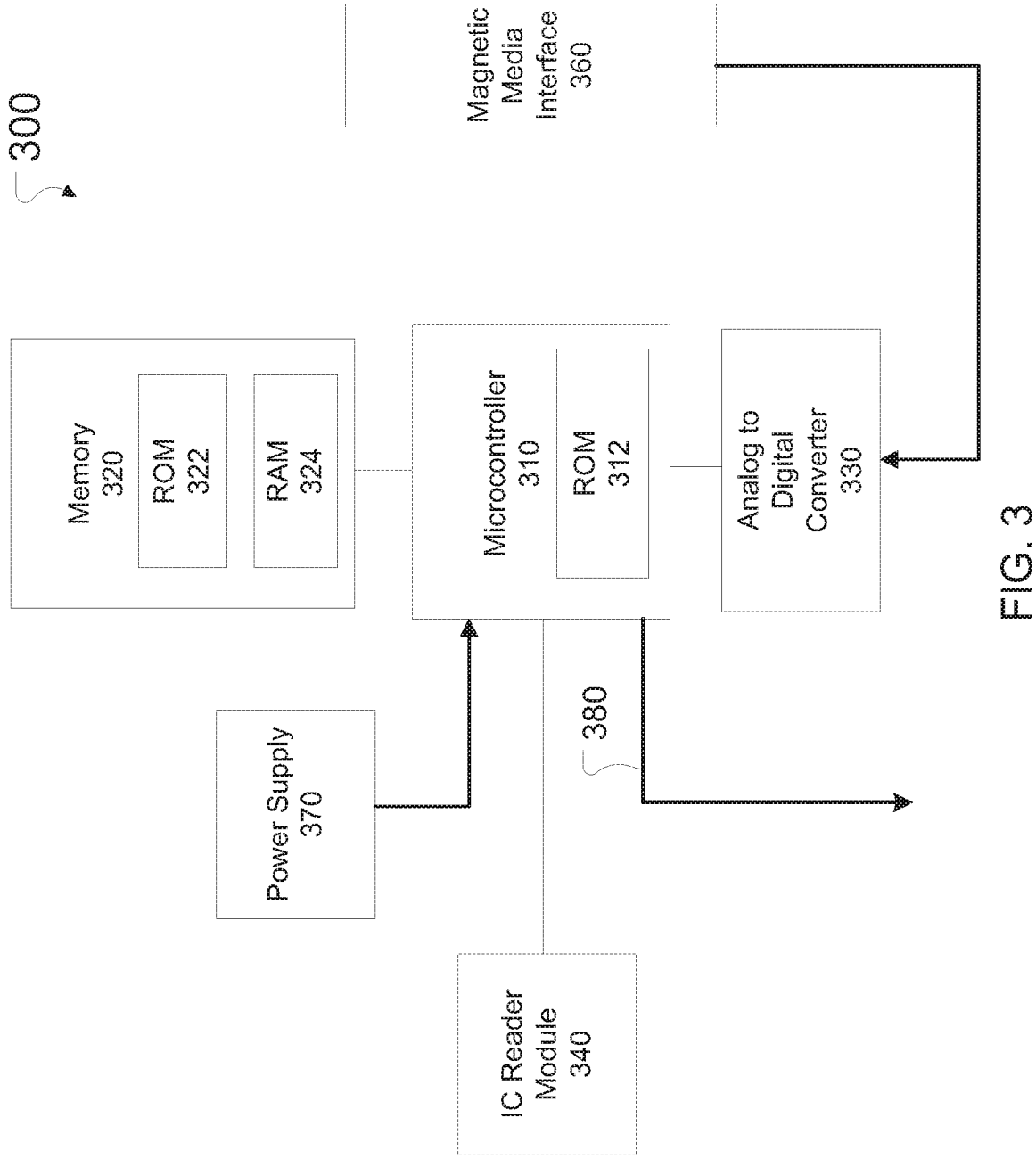
FIG. 3 conceptually illustrates an example configuration of hardware modules for implementing a stacked card reader, according to some aspects of the subject technology.

FIG. 3 depicts an example block diagram of hardware components used to implement a stacked card reader 300 of the subject technology. Stacked card reader 300 includes microcontroller 310, memory 320, analog-to-digital converter (ADC) 330, IC read module 340, media interface 360, and power supply 370.

As illustrated, microcontroller 310 is coupled to memory 320, and ADC 330. Additionally, microcontroller 310 is coupled to IC read module 340, as well as media interface 360, either via ADC 330. Additionally, microcontroller 310 is coupled to communication channel 380, which, as described above, can further include a plug (e.g., plug 106) for use in providing a communicative link between microcontroller 310 and a host mobile device (not illustrated). In some implementations, communication channel 380 can be configured to provide electrical/communicative contact with a protruding plug (e.g., plug 106), such as a TRRS connector, for example, that is configured for insertion into the headphone port of a mobile computing device.

In some implementations, power supply 370 is a battery configured for delivering power to microcontroller 310. However, power supply 370 is not limited to a current storage device. For example, power supply 370 can include a power interface e.g., to an external power supply or power source. By way of example, power supply 370 can provide a coupling to a microphone-line (e.g., of a 3.5 mm TRRS plug) for drawing current from an active device, such as an in-line microphone.

It is understood that stacked reader device 300 can be implemented using various other hardware components and/or configurations, and is not limited to the architecture depicted in FIG. 3. By way of example, microcontroller 310 can be implemented using a general-purpose processor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing.

Memory 320 can include various types of memories, including working memory in the form of random-access memory (RAM) 324 and read-only memory (ROM) 322. Additionally, various types of memory can be utilized in place of, or in addition to, memory 320. For example, the one or more sequences of instructions for operating stacked reader device 300 can be stored as software or firmware in a ROM 322 within microcontroller 310 or in the ROM 322 within memory 320. One or more sequences of instructions can also be software stored and read from another storage medium, such as the flash memory array, or received from the host computing device (e.g., a mobile device such as a smart phone or tablet computing device) via a host interface. ROM, storage mediums, and flash memory arrays represent examples of machine or computer readable media storing instructions/code executable by microcontroller 310. Machine or computer readable media may generally refer to any medium or media used to provide instructions to microcontroller 310, including both volatile media, such as dynamic memory used for storage media or for buffers within microcontroller 310, and non-volatile media, such as electronic media, optical media, and magnetic media.

Magnetic media interface 360 can form a device, or portion thereof, for reading media located on credit cards, debit cards, or objects to obtain payment information. In some implementations, magnetic media interface 360 can be configured to read information from a physical storage medium, such as magnetic storage media (e.g., magnetic stripe media). However, in other implementations, magnetic media interface may be configured for reading other types of electrical or magnetic media.

Similarly, IC read module can be configured for reading integrated circuits, and in particular, embedded circuitry used with financial payment cards, such as IC payment cards.

Figure 4:
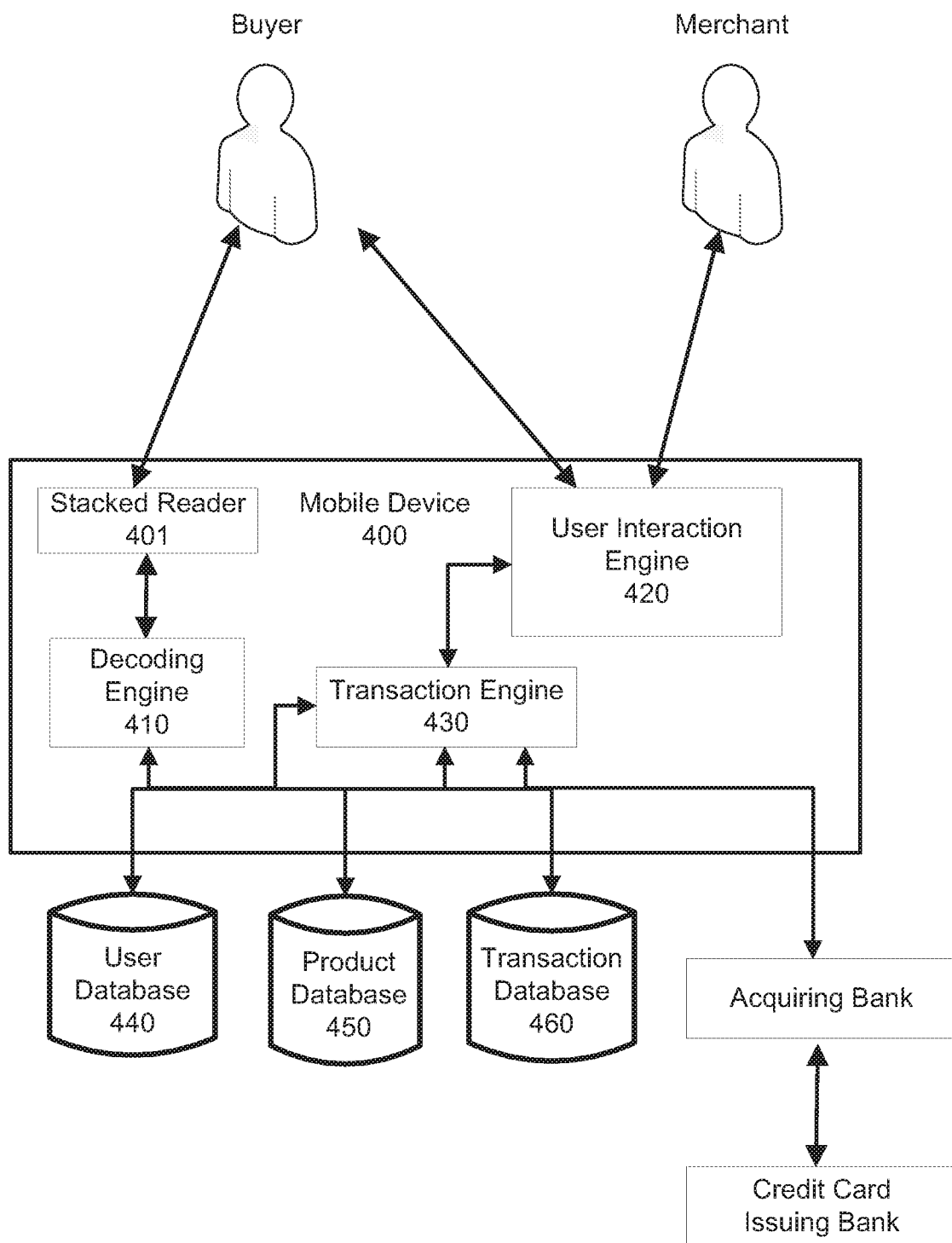
FIG. 4 conceptually illustrates an example environment in which a case containing a stacked card reader can be used to facilitate a financial transaction between a buyer and a merchant.

FIG. 4 illustrates an example environment in which a case and card reader may be used. It will be apparent that the components portrayed in FIG. 4 can be arbitrarily combined or divided into separate software, firmware and/or hardware components. Furthermore, it will also be apparent that such components, regardless of how they are combined or divided, can execute on the same host or multiple hosts, and wherein multiple hosts can be connected by one or more networks.

In the example of FIG. 4, the system includes a mobile device 400, a stacked reader 401 connected to mobile device 400, a decoding engine 410, a user interaction engine 420, and a transaction engine 430, all running on mobile device 400. Additionally, the system may also include one or more of a user database 440, a product or service database 450, and a transaction database 460, all coupled to the transaction engine 430.

Consistent with aspects of the subject technology, stacked reader 401 can be physically integrated into a case, such as that discussed above with respect to FIGS. 1A-C, which contains or surrounds mobile device 400.

As used herein, the term engine can refer to software, firmware, hardware, and/or other components used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically involves the execution of drivers. The drivers may or may not be considered part of the engine, but the distinction is not critical.

As used herein, the term database is used broadly to include any known or convenient means for storing data, whether centralized or distributed, relational or otherwise.

In the example of FIG. 4, mobile device 400 to which stacked reader 401 is connected can be, but is not limited to, a cell phone, such as Apple's iPhone, other portable electronic devices, such as Apple's iPod Touches, Apple's iPads, and mobile devices based on Google's Android operating system and any other portable electronic device that includes software, firmware, hardware, or any combination capable of at least receiving the signal, decoding if needed, exchanging information with a transaction server to verify the buyer and/or seller's account information, conducting the transaction, and generating a receipt. Typical components of mobile device 400 can include but are not limited to persistent memories like flash ROM, random access memory like SRAM, a camera, a battery, LCD driver, a display, a cellular antenna, a speaker, a Bluetooth circuit, and WiFi circuitry, where the persistent memory may contain programs, applications, and/or an operating system for the mobile device.

In some implementations, a system is provided with transaction engine 430 running on mobile device 400. In response to a financial transaction between a buyer and a seller, mobile device 400 accepts information selected including but not limited to information from financial transaction or information pertaining to financial transaction card used by the buyer in the transaction. Additionally, a financial transaction device can be utilized, Non-limiting examples of financial transaction devices include but are not limited to a, wristband, RFID chip, cell phone, biometric marker and the like. At least a portion of this information is communicated with a third party financial institution or payment network to authorize the transaction.

Payment confirmation can be made with a communication channel of the buyer's choice. As non-limiting examples, confirmation of payment can be an electronic notification in the form selected from at least one of, email, SMS message, tweet (message delivered via Twitter), instant message, communication within a social network and the like. In response to the transaction, a confirmation is made that the buyer is authorized to use the financial transaction card. In certain implementations, a confirmation can be provided that indicates a sufficiency of funds available to the buyer.

In the example of FIG. 4, stacked reader 401 is configured to read data encoded in either a magnetic strip (or IC) of a card being swiped by a buyer and send a signal that corresponds to the data read to mobile device 400. However, as discussed above, stacked reader 401 is configured to receive various payment card types, including but not limited to IC cards that can be provided to reader 401 using a dip-slot.

The size of reader 401 can be miniaturized to be portable for connection with mobile device 400. For example, the size of stacked card reader 401 can be miniaturized to an overall length of less than 1.5". In addition, the miniaturized stacked card reader 401 is also designed to reliably read the card with minimum error via a single swipe by counteracting vendor specific filtering done by mobile device 400. Note that this broad overview is meant to be non-limiting as components to this process are represented in different embodiments.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, flash memory (e.g., SD cards, mini-SD cards, micro-SD cards, etc.), magnetic and/or solid state hard drives, read-only and recordable Blu-Ray® discs, ultra density optical discs, any other optical or magnetic media. The computer-readable media can store a computer program that is executable by at least one processing unit, such as a microcontroller, and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A payment object reader comprising:
a first slot of a plurality of slots, the first slot configured for receiving a magnetic stripe of a magnetic stripe payment card;
a second slot of the plurality of slots, wherein an interior planar surface of the second slot is disposed parallel to an interior planar surface of the first slot, the second slot configured for receiving an integrated circuit (IC) chip of an IC chip payment card;
stacked reader circuitry comprising magnetic stripe read circuitry and IC chip read circuitry electrically coupled to two respective surfaces of a printed circuit board (PCB), wherein the magnetic stripe read circuitry is configured to read information from the magnetic stripe of the magnetic stripe payment card upon receipt of the magnetic stripe via the first slot, wherein the IC chip read circuitry is configured to read the information from the integrated circuit (IC) chip of the IC payment card upon receipt of the IC chip via the second slot, wherein at least a portion of the magnetic stripe read circuitry is configured to displace toward the second slot upon receipt of the magnetic stripe via the first slot, and wherein at least a portion of the IC chip read circuitry is configured to displace toward the first slot upon receipt of the IC chip via the second slot; and
a battery to supply power to the stacked reader circuitry.

2. The payment object reader of claim 1, wherein at least a portion of the magnetic stripe read circuitry is configured to pass through the PCB when the magnetic stripe read circuitry displaces toward the IC chip read circuitry upon receipt of the magnetic stripe via the first slot.

3. The payment object reader of claim 1, wherein at least a portion of the IC chip read circuitry is configured to pass through the PCB when the IC chip read circuitry displaces toward the magnetic stripe read circuitry upon receipt of the IC chip via the second slot.

4. The payment object reader of claim 1, further comprising a wireless transceiver that communicates the information from the payment object reader to a mobile computing device via at least one of Bluetooth™ or Bluetooth™ low-energy.

5. The payment object reader of claim 1, further comprising an electrical connector that conveys the information from the payment object reader to a mobile computing device.

6. The payment object reader of claim 1, further comprising a power interface connector that is configured to draw power from an external power source, wherein the power interface connector is a Universal Serial Bus (USB) connector.

7. The payment object reader of claim 1, further comprising a power interface connector that is configured to draw power from an external power source, wherein the power interface connector includes at least one of an audio jack or an audio plug.

8. The payment object reader of claim 1, further comprising a power interface connector that is configured to draw power from an external power source, wherein the power interface connector is a Lightning™ connector.

9. The payment object reader of claim 1, further comprising a power interface connector that is configured to draw power from an external power source, wherein the power interface connector is a dock connector.

10. The payment object reader of claim 1, wherein the magnetic stripe read circuitry is configured to displace toward the IC chip read circuitry temporarily upon receipt of the magnetic stripe via the first slot, and wherein the IC chip read circuitry is configured to displace toward the magnetic stripe read circuitry temporarily upon receipt of the IC chip via the second slot.

11. The payment object reader of claim 1, wherein the PCB includes a plurality of conductive layers and anti-tamper circuitry connected to the plurality of conductive layers, the anti-tamper circuitry to detect a drill passing through the plurality of conductive layers of the PCB.

12. A printed circuit board (PCB) for use in a payment object reader, the PCB comprising:
a first surface of the PCB;
a second surface of the PCB;
integrated circuit (IC) chip read circuitry at least partially disposed along the first surface of the PCB, wherein the IC chip read circuitry is configured to read information from an IC chip of an IC chip card that passes over and parallel to the first surface of the PCB;
magnetic stripe read circuitry at least partially disposed along the second surface of the PCB, wherein the magnetic stripe read circuitry is configured to read the information from a magnetic stripe of a magnetic stripe card that passes over and parallel to the second surface of the PCB and that displaces the magnetic stripe read circuitry toward the IC chip read circuitry; and
power supply circuitry disposed on the PCB, wherein the power supply circuitry is configured to couple a battery to the magnetic stripe read circuitry and to the IC chip read circuitry.

13. The PCB of claim 12, wherein at least a portion of the magnetic stripe read circuitry is configured to pass through the second surface of the PCB when the magnetic stripe read circuitry displaces toward the IC chip read circuitry.

14. The PCB of claim 12, wherein the IC chip read circuitry is configured to displace toward the magnetic stripe read circuitry when the IC chip passes over and parallel to the first surface of the PCB.

15. The PCB of claim 14, wherein at least a portion of the IC chip read circuitry is configured to pass through the first surface of the PCB when the IC chip read circuitry displaces toward the magnetic stripe read circuitry.

16. The PCB of claim 12, further comprising a wireless transceiver that communicates the information from the payment object reader to a mobile computing device via at least one of Bluetooth™ or Bluetooth™ low-energy.

17. The PCB of claim 12, wherein the power supply circuitry includes a power interface connector that is configured to draw power from an external power source, wherein the power interface connector is a Universal Serial Bus (USB) connector.

18. The PCB of claim 12, wherein the power supply circuitry includes a power interface connector that is configured to draw power from an external power source, wherein the power interface connector is a dock connector.

19. A method for facilitating a payment transaction, the method comprising:
receiving an integrated circuit (IC) chip via a first slot;
powering IC chip read circuitry via a battery;
reading IC chip information from the IC chip via the IC chip read circuitry in response to receiving the IC chip via the first slot and powering the IC chip read circuitry via the battery;
receiving a magnetic stripe via a second slot, wherein an interior planar surface of the second slot is disposed parallel to an interior planar surface of the first slot;
powering magnetic stripe read circuitry via the battery, wherein the magnetic stripe read circuitry is configured to displace toward the IC chip read circuitry upon receipt of the magnetic stripe via the first slot;
reading magnetic stripe information from the magnetic stripe via the magnetic stripe read circuitry in response to receiving the magnetic stripe via the first slot and powering the magnetic stripe read circuitry via the battery; and
communicating the magnetic stripe information and the IC chip information wirelessly to a mobile computing device.

20. The method of claim 19, wherein the magnetic stripe information and the IC chip information are communicated wirelessly to the mobile computing device via at least one of Bluetooth™ or Bluetooth™ low-energy.

* * * * *